(12) United States Patent
Luedtke et al.

(10) Patent No.: US 12,012,167 B2
(45) Date of Patent: Jun. 18, 2024

(54) APPARATUS, SYSTEMS, AND METHODS FOR ROTATING LOCK CABLES

(71) Applicant: Lyft, Inc., San Francisco, CA (US)

(72) Inventors: Peter Rex Luedtke, San Francisco, CA (US); Andrew Paul Rosenkranz, Hoboken, NJ (US)

(73) Assignee: Lyft, Inc., San Francisco, CA (US)

( * ) Notice: Subject to any disclaimer, the term of this patent is extended or adjusted under 35 U.S.C. 154(b) by 962 days.

(21) Appl. No.: 16/389,839

(22) Filed: Apr. 19, 2019

(65) Prior Publication Data

US 2020/0331549 A1 Oct. 22, 2020

(51) Int. Cl.
*B62H 5/00* (2006.01)

(52) U.S. Cl.
CPC ....... *B62H 5/003* (2013.01); *B62H 2005/008* (2013.01)

(58) Field of Classification Search
CPC .. B62H 5/003; B62H 2005/008; B62H 5/145; G07F 17/0057; G07F 17/10; B62J 15/00; B62J 50/21; A47B 81/00; B62K 3/002
See application file for complete search history.

(56) References Cited

U.S. PATENT DOCUMENTS

| | | | |
|---|---|---|---|
| 2,406,257 A | 8/1946 | Romero et al. | |
| 2,416,505 A | 2/1947 | Trautner | |
| 3,438,227 A | 4/1969 | Wolniak | |
| 4,028,916 A * | 6/1977 | Pender | E05B 67/003 |
| | | | 70/49 |
| 4,033,160 A | 7/1977 | Mima | |
| 4,044,577 A * | 8/1977 | Horlacher | E05B 73/0011 |
| | | | 70/49 |
| 4,126,024 A * | 11/1978 | Timmons | E05B 67/006 |
| | | | 242/379.2 |
| 4,536,754 A | 8/1985 | Holce et al. | |
| 4,920,334 A * | 4/1990 | DeVolpi | B62H 3/04 |
| | | | 340/568.4 |
| 5,212,972 A | 5/1993 | Kincaid et al. | |
| 5,270,681 A * | 12/1993 | Jack | B62H 5/003 |
| | | | 340/432 |

(Continued)

FOREIGN PATENT DOCUMENTS

| | | |
|---|---|---|
| CN | 207725522 | 8/2018 |
| DE | 102014018476 | 12/2014 |

(Continued)

OTHER PUBLICATIONS

International Search Report and Written Opinion, PCT/US2020/028830, dated Jul. 28, 2020, 94 pages.

(Continued)

*Primary Examiner* — Ko H Chan
(74) *Attorney, Agent, or Firm* — Baker Botts L.L.P.

(57) ABSTRACT

The disclosed apparatus may include a rotating locking cable and anchor for a lock for wheeled objects, including wheeled vehicles. A rotating locking cable and anchor may securely fasten a lock and/or a component of a lock, such as a pin, to a wheeled vehicle without impeding a user's ability to lock and unlock the lock. In some embodiments, a rotating locking cable may rotate along multiple axes in order to facilitate easy mobility of a pin between a lock and a pin holster. Various other methods, systems, and apparatuses are also disclosed.

19 Claims, 18 Drawing Sheets

(56) References Cited

U.S. PATENT DOCUMENTS

| | | | | |
|---|---|---|---|---|
| 5,274,353 | A | * | 12/1993 | Bianchi .................. F16G 13/10 |
| | | | | 340/568.1 |
| 5,291,765 | A | | 3/1994 | Hoisington |
| 5,372,019 | A | | 12/1994 | Hsiao |
| 5,406,257 | A | | 4/1995 | Saito |
| 5,408,212 | A | * | 4/1995 | Meyers ................. E05B 45/005 |
| | | | | 340/432 |
| 5,408,213 | A | | 4/1995 | Ungarsohn |
| 5,440,904 | A | | 8/1995 | Su |
| 5,463,885 | A | | 11/1995 | Warren, Sr. |
| 5,488,844 | A | | 2/1996 | Winner |
| 5,709,113 | A | | 1/1998 | Godfrey |
| 5,823,025 | A | * | 10/1998 | Phifer ..................... B62H 5/18 |
| | | | | 70/38 R |
| 5,829,280 | A | * | 11/1998 | Chen ..................... E05B 67/003 |
| | | | | 70/386 |
| 5,889,463 | A | * | 3/1999 | Judd .................. B60R 25/1001 |
| | | | | 340/432 |
| 6,227,016 | B1 | * | 5/2001 | Yu ........................... E05B 37/14 |
| | | | | 70/52 |
| 6,761,051 | B1 | | 7/2004 | Tsai |
| 6,965,294 | B1 | | 11/2005 | Elliott et al. |
| 7,225,649 | B2 | | 6/2007 | Wyers |
| 7,428,833 | B2 | | 9/2008 | Tollefson |
| 7,594,416 | B2 | | 9/2009 | Bosin |
| 7,631,525 | B1 | | 12/2009 | Kennealy |
| 7,898,439 | B2 | | 3/2011 | Bettez et al. |
| 8,065,895 | B2 | | 11/2011 | Andersen |
| 8,225,629 | B2 | | 7/2012 | Zuraski et al. |
| 8,779,933 | B2 | | 7/2014 | Hartmann et al. |
| 9,013,301 | B2 | * | 4/2015 | Williams ............... B62H 5/003 |
| | | | | 340/568.1 |
| 9,523,218 | B1 | * | 12/2016 | McGraw ............... E05B 39/005 |
| 9,567,772 | B1 | * | 2/2017 | Snell ...................... B62H 5/003 |
| 9,816,296 | B2 | * | 11/2017 | Denny .................... E05B 37/02 |
| 9,830,579 | B2 | | 11/2017 | Warren et al. |
| 9,830,759 | B2 | | 11/2017 | Hilton et al. |
| 2005/0000255 | A1 | | 1/2005 | Wyers |
| 2009/0201127 | A1 | | 8/2009 | Stobbe |
| 2010/0313614 | A1 | | 12/2010 | Rzepecki |
| 2012/0299755 | A1 | | 11/2012 | Jones |
| 2013/0036781 | A1 | | 2/2013 | Hartmann et al. |
| 2013/0255336 | A1 | * | 10/2013 | Desai ...................... B62H 3/04 |
| | | | | 70/431 |
| 2013/0285393 | A1 | | 10/2013 | Roatis et al. |
| 2019/0047646 | A1 | * | 2/2019 | Mohamed ............. H04W 12/06 |
| 2019/0291800 | A1 | * | 9/2019 | Yu .......................... B62H 5/003 |
| 2022/0185409 | A1 | * | 6/2022 | Guo ........................ B62H 5/003 |

FOREIGN PATENT DOCUMENTS

| | | | |
|---|---|---|---|
| EP | 1623914 | | 2/2006 |
| EP | 2039599 | | 3/2009 |
| EP | 3069968 | | 9/2016 |
| EP | 3069968 | A1 * | 9/2016 |
| KR | 20180015541 | | 2/2018 |
| TW | M549183 | | 9/2017 |
| WO | WO 2011/057755 | | 5/2011 |

OTHER PUBLICATIONS

International Search Report and Written Opinion, PCT/US2020/028573, dated Jul. 15, 2020, 108 pages.

Luedtke et al., "Apparatus, Systems, and Methods for Single-Sided Locks", U.S. Appl. No. 16/389,837, filed Apr. 19, 2019, 73 pages.

Luedtke et al., "Systems and Methods for Magnet-Equipped Locks", U.S. Appl. No. 16/389,843, filed Apr. 19, 2019, 68 pages.

* cited by examiner

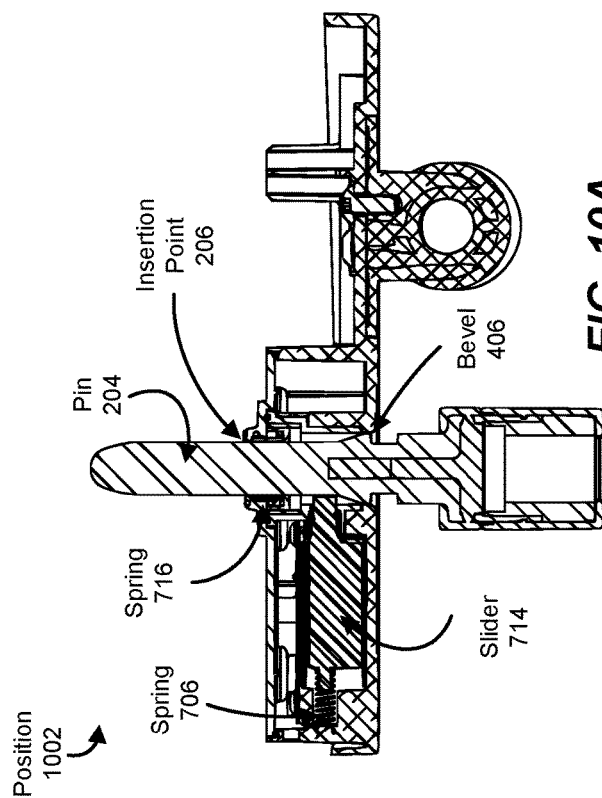
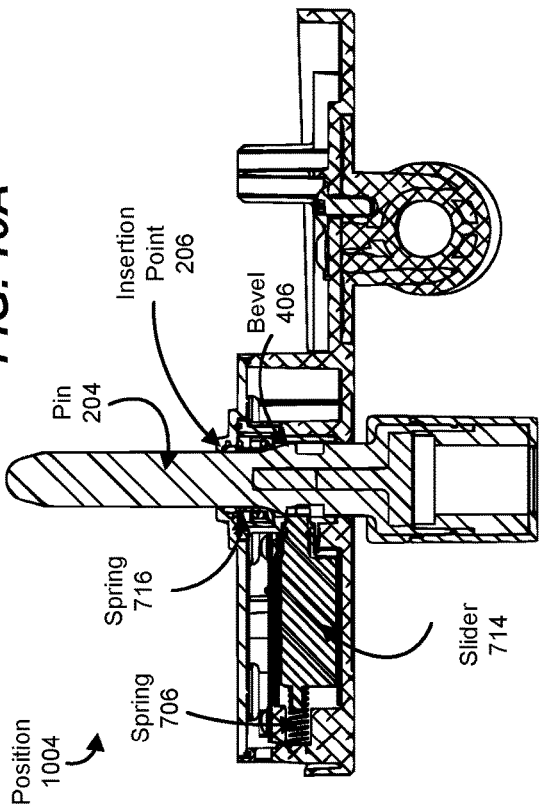
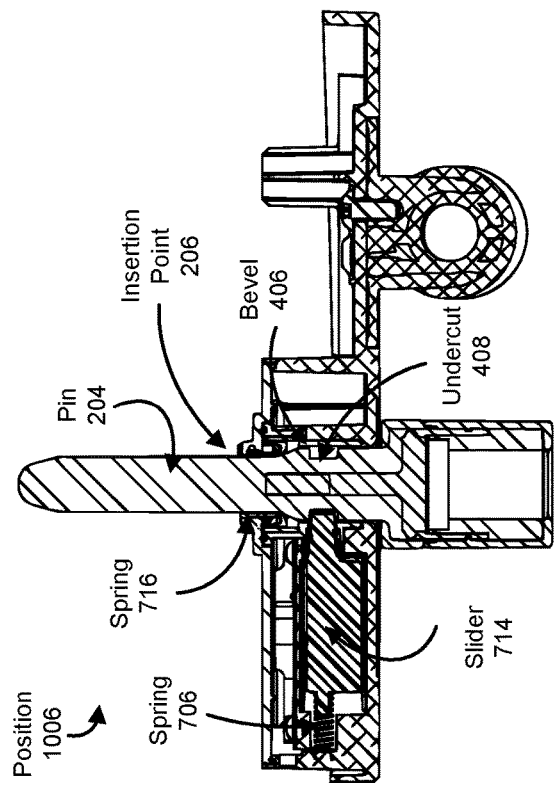
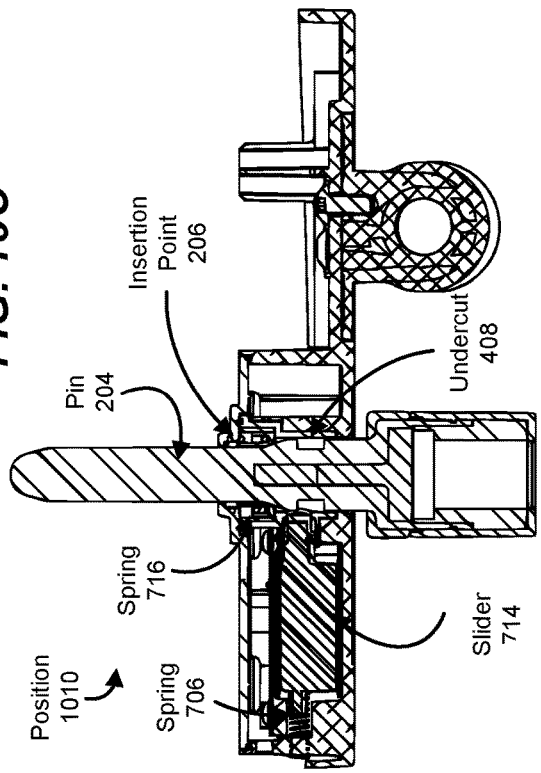

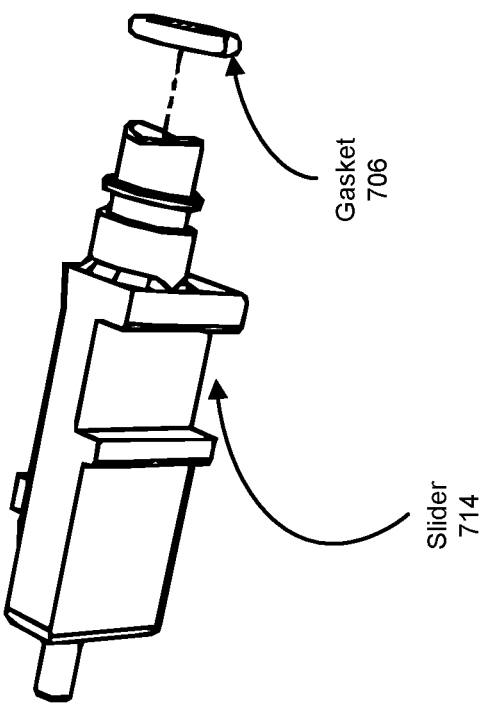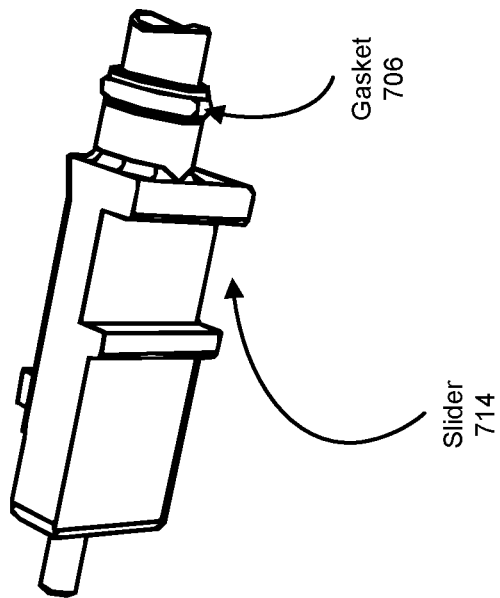
FIG. 12

APPARATUS, SYSTEMS, AND METHODS FOR ROTATING LOCK CABLES

BACKGROUND

Some transportation services may provide transportation on demand, drawing from a transportation supply pool that includes vehicles of multiple types to meet the needs of those requesting transportation as the needs arise. Including personal mobility vehicles such as bicycles and scooters in a dynamic transportation network may enable transportation requestors to complete portions of a journey more efficiently. However, unlocking a personal mobility vehicle as the start of a journey and/or locking the personal mobility vehicles at the end of the journey may be points of friction that delay trips or increase user frustration.

Many traditional systems for locking personal mobility vehicles may have drawbacks, especially when used in the context of a dynamic transportation network. For example, a traditional cable lock may enable a user to lock a personal mobility vehicle associated with the dynamic transportation network to an additional vehicle, preventing others with legitimate access to the additional vehicle from using the additional vehicle. Some types of traditional locks may be clunky and, when unlocked, interfere with the operation of the personal mobility vehicle. Some types of traditional locks may be unintuitive to users who have not previously operated a lock of that type, adding frustration and delay. Accordingly, the instant disclosure identifies and addresses a need for additional and improved systems and methods for locks for wheeled vehicles.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIGS. 10A, 10B, 10C, and 10D are illustrations of multiple cutaway views of a pin inserted into a single-sided lock.

FIG. 12 is an illustration of a slider ring component of a single-sided lock.

Figure 1:
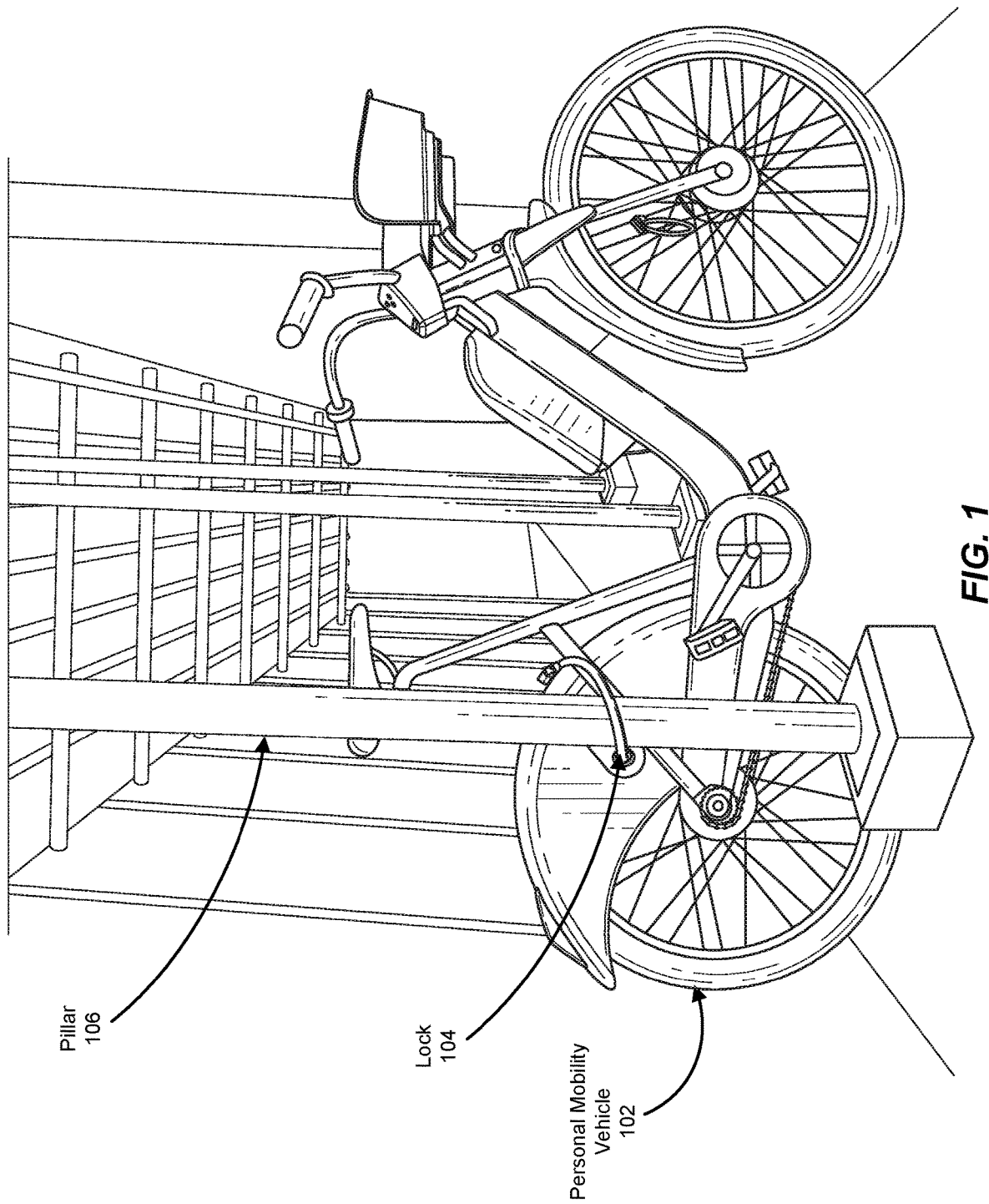
FIG. 1 is an illustration of a personal mobility vehicle secured in place via a rotating locking cable attached to a single-sided lock.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to a rotating locking cable and anchor for a single-sided lock for securing wheeled objects in place. Wheeled objects may include wheeled vehicles as well as non-vehicle objects such as carts, wheelbarrows, and similar. In some embodiments, a single-sided lock may be less physically clunky than a U-lock or cable lock and/or may be more compatible with small-wheeled vehicles such as scooters. In some embodiments, a single-sided lock may include a pin that is pushed in between two spokes of a wheel to lock the vehicle and removed from between the spokes of the wheel to unlock the vehicle. In one embodiment, a single-sided lock may include a pin holster for securing the pin while the vehicle is unlocked (e.g., while the vehicle is in motion). In some embodiments, a single-sided lock mechanism may be permanently affixed to and/or built in to a vehicle, increasing the ease of use of the single-sided lock by preventing users from misplacing the lock. In one embodiment, a rotating locking cable may enable the wheeled vehicle to be locked to a variety of types of objects, such as vertically-oriented objects (e.g., lamp posts and/or bicycle racks), horizontally-oriented objects (e.g., railings), and/or diagonally-oriented objects (e.g., handrails on stairs).

Additionally, because locking and unlocking vehicles is a large part of the user experience when accessing transportation via personal mobility vehicles (PMVs) such as scooters and bicycles, affixing the lock to the PMV may improve the user experience and the security of the PMV by eliminating the possibility that the user will misplace the lock. In some embodiments, a rotating locking cable and anchor may securely fasten a lock and/or a component of a lock (such as a pin) to a PMV without impeding a user's ability to lock and unlock the lock. In some embodiments, a rotating locking cable may rotate along multiple axes in order to facilitate easy mobility of a pin between a lock and a pin holster. In one embodiment, a rotating locking cable may be constructed of sturdy components and/or may be at least a certain diameter to improve the security of the lock.

As will be explained in greater detail below, a PMV equipped with a single-sided lock with a rotating locking cable may be part of a dynamic transportation matching system may arrange transportation on an on-demand and/or ad-hoc basis by, e.g., matching one or more transportation requestors and/or transportation requestor devices with one or more transportation providers and/or transportation provider devices. For example, a dynamic transportation matching system may match a transportation requestor to a transportation provider that operates within a dynamic transportation network (e.g., that is managed by, coordinated by, and/or drawn from by the dynamic transportation matching system to provide transportation to transportation requestors).

In some examples, available sources of transportation within a dynamic transportation network may include vehicles that are owned by an owner and/or operator of the dynamic transportation matching system. Additionally or alternatively, sources of transportation within a dynamic transportation network may include vehicles that are owned outside of the dynamic transportation network but that participate within the dynamic transportation network by agreement. In some examples, the dynamic transportation network may include lane-bound vehicles (e.g., cars, light trucks, etc.) that are designed, dimensioned, adapted, and/or required to operate within road lanes. Furthermore, the dynamic transportation network may include PMVs that are capable of traversing routes not accessible to lane-bound vehicles, such as walking paths, sidewalks, and/or bicycle lanes. Additionally or alternatively, PMVs may operate with more agility and/or flexibility than lane-bound vehicles by, e.g., operating between road lanes (e.g., lane splitting, operating abreast with other PMVs in the same road lane, etc.). Examples of PMVs may include, without limitation, manual bicycles, electrical bicycles, manual scooters, electrical scooters, and/or unicycles.

FIG. 1 illustrates a PMV secured in place via a single-sided lock with a rotating locking cable. In some examples, the rotating locking cable may secure a wheeled vehicle to a stationary object such as a docking station, bicycle rack, railing, and/or other stationary architectural feature. For example, a lock 104 may secure a PMV 102 to a pillar 106. In some examples, a lock may prevent a PMV or other wheeled vehicle from moving easily (e.g., by preventing one of the wheels from rotating via the insertion of a pin) without securing the vehicle to another object. In some examples, securing PMV 102 to an object such as pillar 106 via a rotating locking cable may be a secondary measure that further increases the difficulty of moving PMV 102, in addition to the difficulty in moving PMV 102 caused by inhibiting the movement of the wheel. In some embodiments, lock 104 may be positioned on PMV 102 to facilitate locking PMV 102 to objects via the rotating locking cable. In some examples, inhibiting the movement of a wheeled vehicle when the vehicle is not in use may deter theft of the vehicle.

Figure 2:
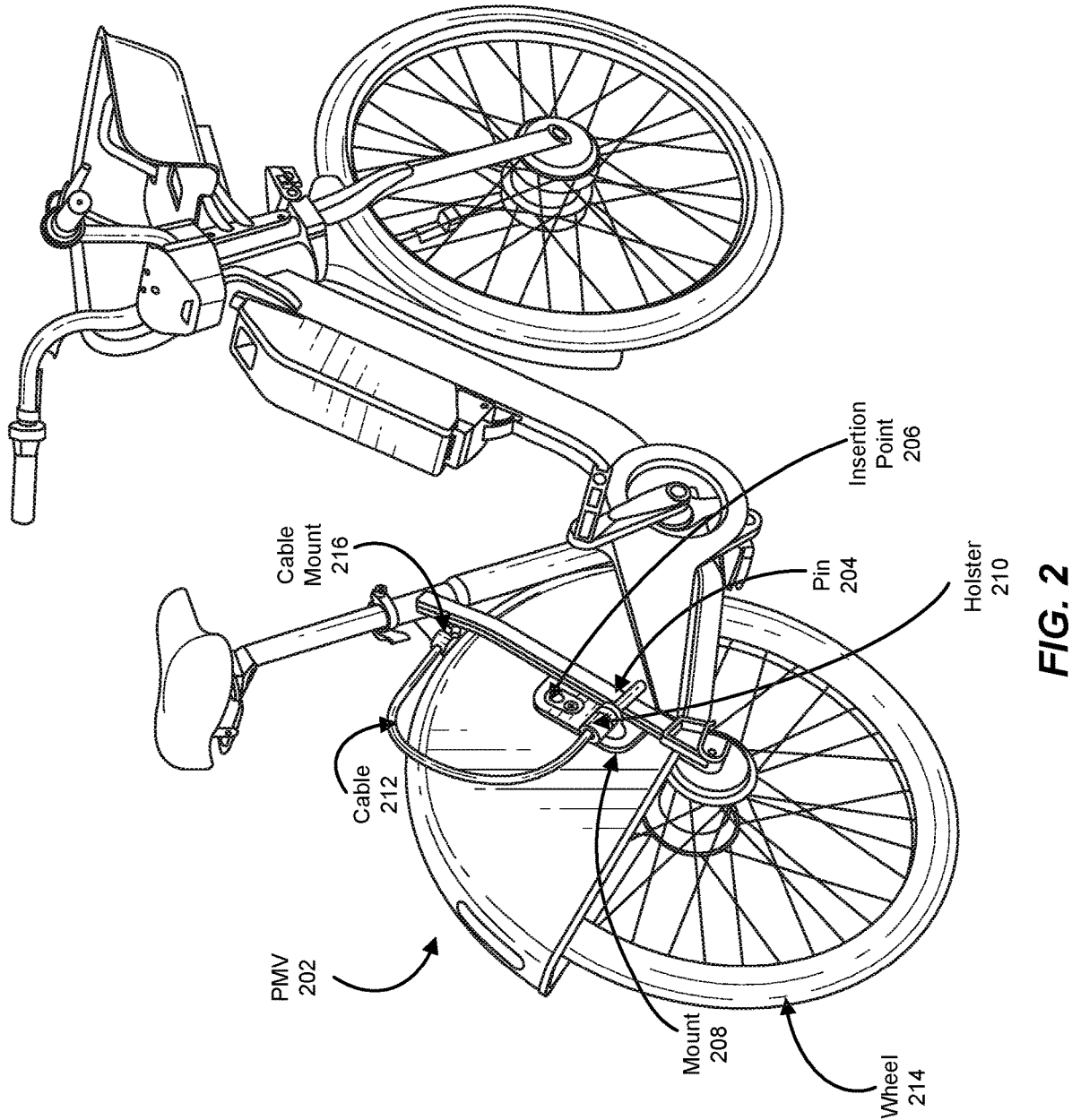
FIG. 2 is an illustration of a single-sided lock with a rotating locking cable mounted on a personal mobility vehicle.

FIG. 2 illustrates a single-sided lock with a rotating locking cable mounted on a PMV 202. As illustrated in FIG. 2, in some embodiments, a single-sided lock may include a cable 212 that originates from a cable mount 216 and connects to a pin 204 that may be inserted into either an insertion point 206 (e.g., to lock PMV 202) or a holster 210 (e.g., while unlocked) on a mount 208. In some embodiments, cable 212 may rotate relative to cable mount 216 along one or more axes of rotation, enabling cable 212 to be easily locked around stationary objects while pin 204 is inserted into insertion point 206. In some examples, pin 204 may generally represent any type of insertable lock component that is capable of being inserted between two or more spokes of a wheel. In some embodiments, mount 208 may be affixed to PMV 202 such that insertion point 206 is adjacent to a wheel 214, enabling pin 204 to be inserted between two or more spokes of wheel 214. Although illustrated with a bicycle, a single-sided lock as illustrated in FIG. 2 may be similarly attached to a scooter or other type of wheeled vehicle. In some embodiments, the single-sided lock may be built in to a fender and/or other part of PMV 202. In some embodiments, a single-sided lock may include multiple pins, such as two pins that are each inserted between separate spokes of a wheel.

Figure 3A:
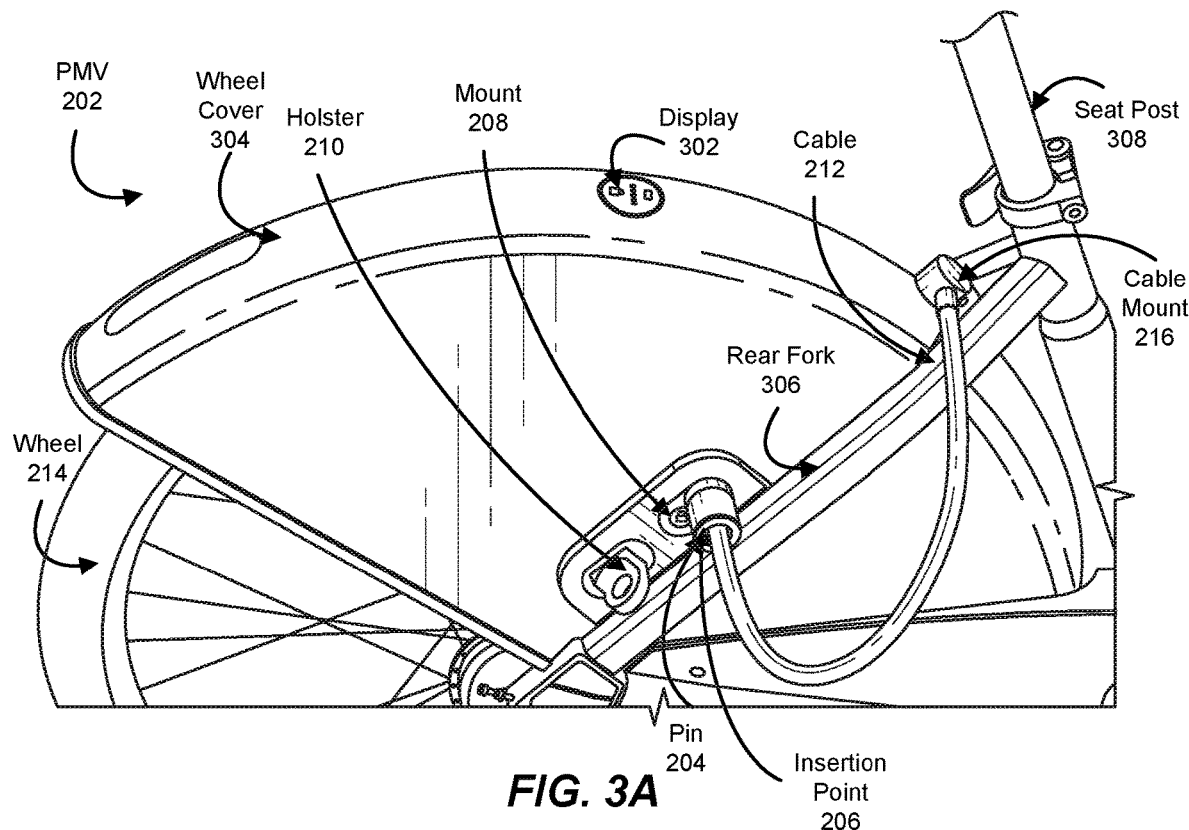
FIG. 3A is a side view of a PMV equipped with a single-sided lock with a rotating locking cable in a locked state.
Figure 3B:
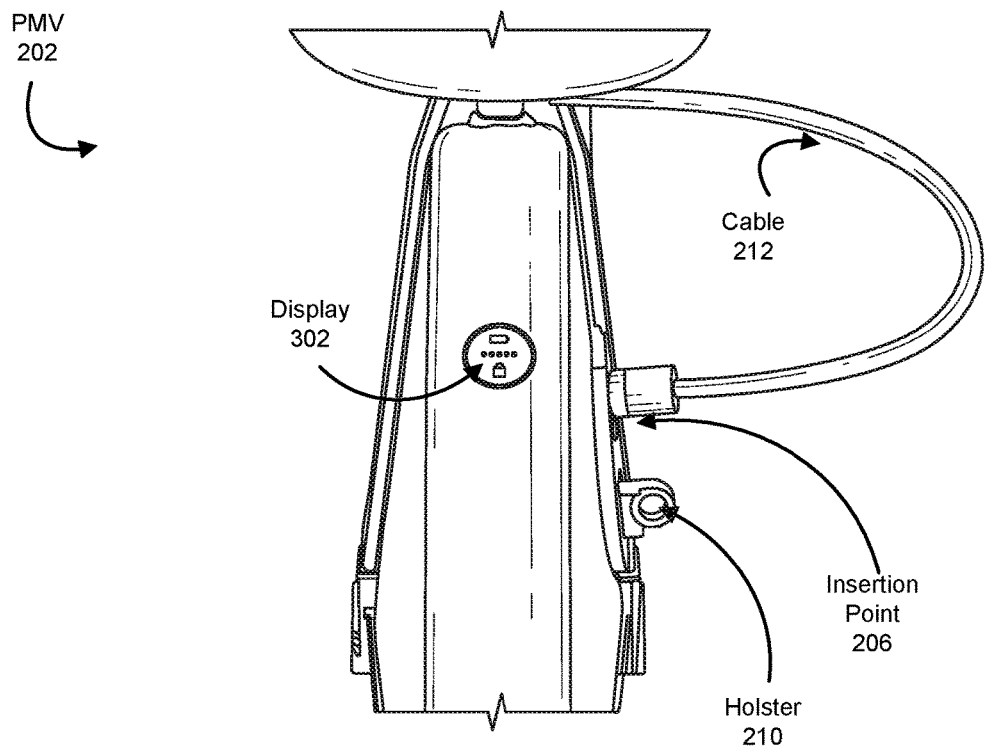
FIG. 3B is a rear view of a PMV equipped with a single-sided lock with a rotating locking cable in a locked state.

FIGS. 3A and 3B illustrate a single-sided lock in a locked state. As illustrated in FIGS. 3A and 3B, PMV 202 may be equipped with a mount 208 that includes insertion point 206 and/or holster 210. In some examples, pin 204 may be inserted into insertion point 206 that is positioned in such a way that pin 204 is between spokes of wheel 214, inhibiting wheel 214 from rotating and thus inhibiting PMV 202 from moving. In some embodiments, pin 204 may be coupled to PMV 202 via a flexible cable 212. In one embodiment, PMV 202 may be equipped with a display 302 that displays a current status of the PMV based at least in part on a current status of the lock. For example, display 302 may display an "unlocked" icon when pin 204 is not secured in place in insertion point 206 and/or a "locked" icon when pin 204 is secured in place in insertion point 206. Additionally or alternatively, display 302 may display a status of the PMV relative to a dynamic transportation network, such as "reserved" when it is allocated to a transportation requestor and/or "available" when it is not allocated to a transportation requestor.

In some embodiments, mount 208 and/or cable mount 216 may be positioned to facilitate locking PMV 202 to objects via cable 212. Additionally or alternatively, cable 212 may be dimensioned (e.g., in terms of length) and/or constructed (e.g., in terms of flexibility) to facilitate locking PMV 202 to objects via wrapping cable 212 around an object an inserting pin 204 into insertion point 206. In some embodiments, a combination of the dimensions and/or flexibility of cable 212 as well as the ability of cable 212 to rotate relative to cable mount 216 may facilitate wrapping cable 212 around objects with a variety of heights, sizes, and/or orientations. In one embodiment, cable mount 216 may be affixed to a rear wheel cover 304 of PMV 202. In some embodiments, cable mount 216 may be affixed near a rear fork 306 and/or seat post 308 of PMV 202. For example, cable mount 216 may be affixed to the top of rear wheel cover 304 of PMV 202 just behind seat post 308 and rear fork 306. In one embodiment, mount 208 may be affixed to and/or part of wheel cover 304. In some embodiments, mount 208 may be affixed to wheel cover 304 just behind rear fork 306. In some embodiments, mount 208 may be affixed to the side of wheel cover 304 towards the bottom of wheel cover 304 (e.g., closer to the bottom edge of wheel cover 304 than the top edge of wheel cover 304). Mount 208 being positioned towards the bottom of wheel cover 304 while cable mount 216 is affixed to the top of wheel cover 304 may afford sufficient distance between mount 208 and cable mount 216 to facilitate looping and/or bending cable 212 around an object (such as pillar 106 in FIG. 1) while pin 204 is locked into insertion point 216, effectively locking PMV 202 to the object. In embodiments where both mount 208 and cable mount 216 are affixed to wheel cover 304 near rear fork 306, the relative positions of mount 208 and cable mount 216 may facilitate a diagonal positioning of cable 212 when pin 204 is inserted into insertion point 216, enabling a user to position cable 212 around a horizontal, vertical, or diagonal object with relative ease. For example, a user may position cable 212 around a horizontal handrail, a vertical light post, and/or a diagonal stairway railing.

Figure 4:
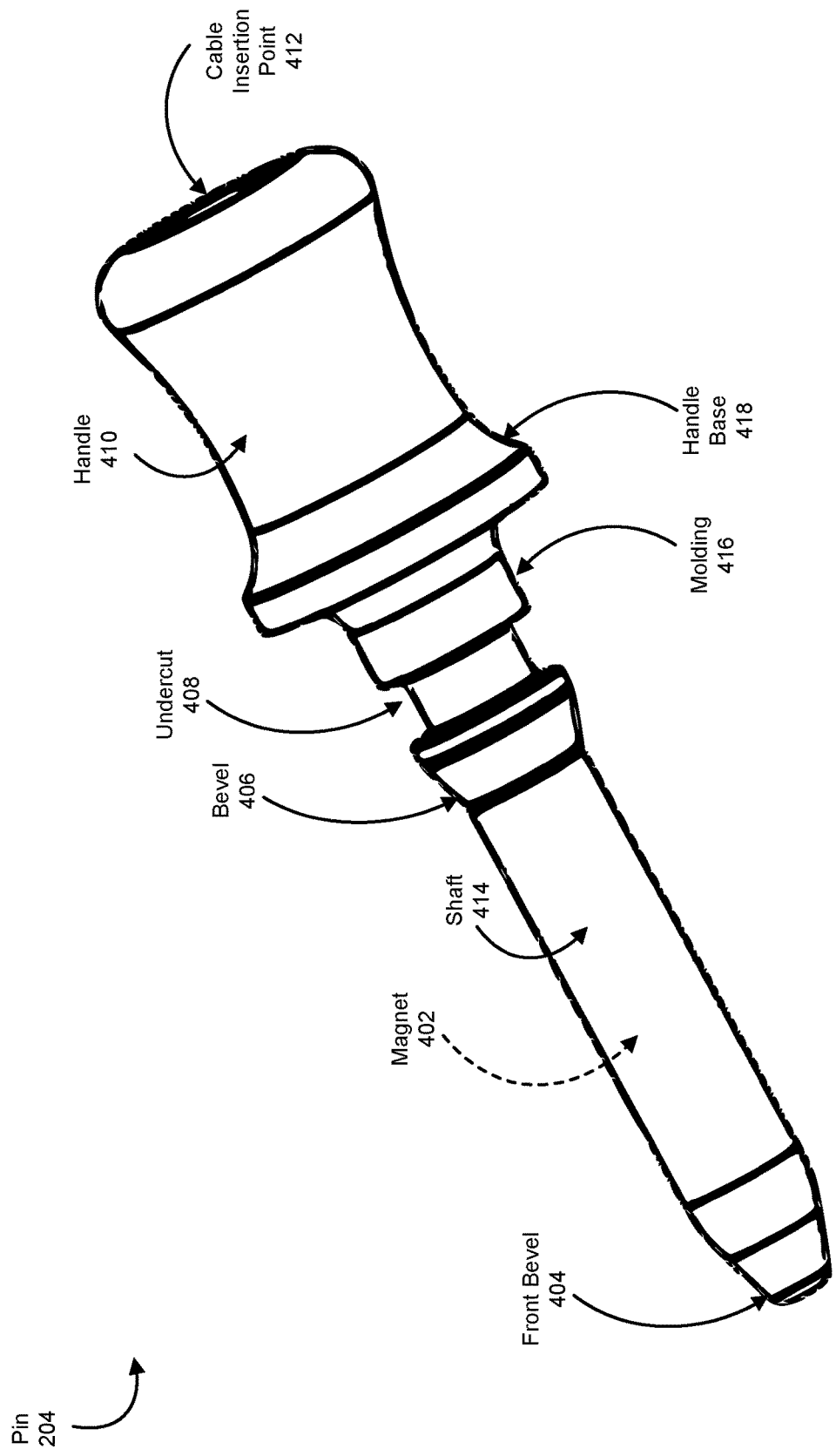
FIG. 4 is an illustration of a pin component of a single-sided lock with a rotating locking cable.

FIG. 4 illustrates pin 204 in detail. As illustrated in FIG. 4, pin 402 may have a bevel 406 leading to an undercut 408. In some examples, bevel 406 may push a slider out of the way as pin 402 enters the insertion point of a mount and the slider may then engage with undercut 408 to lock pin 402 in place within the mount and prevent pin 402 from being removed from the mount. In one embodiment, undercut 408 may be defined by a concavity in between bevel 406 and molding 416. In some embodiments, bevel 406 may not be present and pin 402 may have substantially parallel sides leading up to undercut 408. In one embodiment, pin 204 may have a front bevel 404 that pushes a slider and/or other components of a lock out of the way as pin 204 enters an insertion point of the lock. In some embodiments, front bevel 404 may lead to a shaft 414 with substantially parallel sides. In one embodiment, shaft 414 may contain a magnet 402 (not shown) that sensors on a lock mount may detect in order to determine the current location and/or position of pin 204. In some embodiments, magnet 402 may extend through and/or past undercut 408. In one embodiment, pin 204 may have a handle 410 that is contoured to be easily grasped by a user. In some embodiments, handle 410 may be substantially wider than shaft 414. In one embodiment, handle 410 may have a flared base and/or rounded top. For example, handle base 418 may be large than the opening of insertion point 206, preventing pin 204 from being inserted into mount 208 past molding 416. In some embodiments, pin 204 may have a cable insertion point 412 at the top of handle 410. In one embodiment, cable 212 may connect to pin 204 via cable insertion point 412. In some embodiments, cable insertion point 412 may enable cable 212 to rotate relative to pin 204.

Figure 5B:
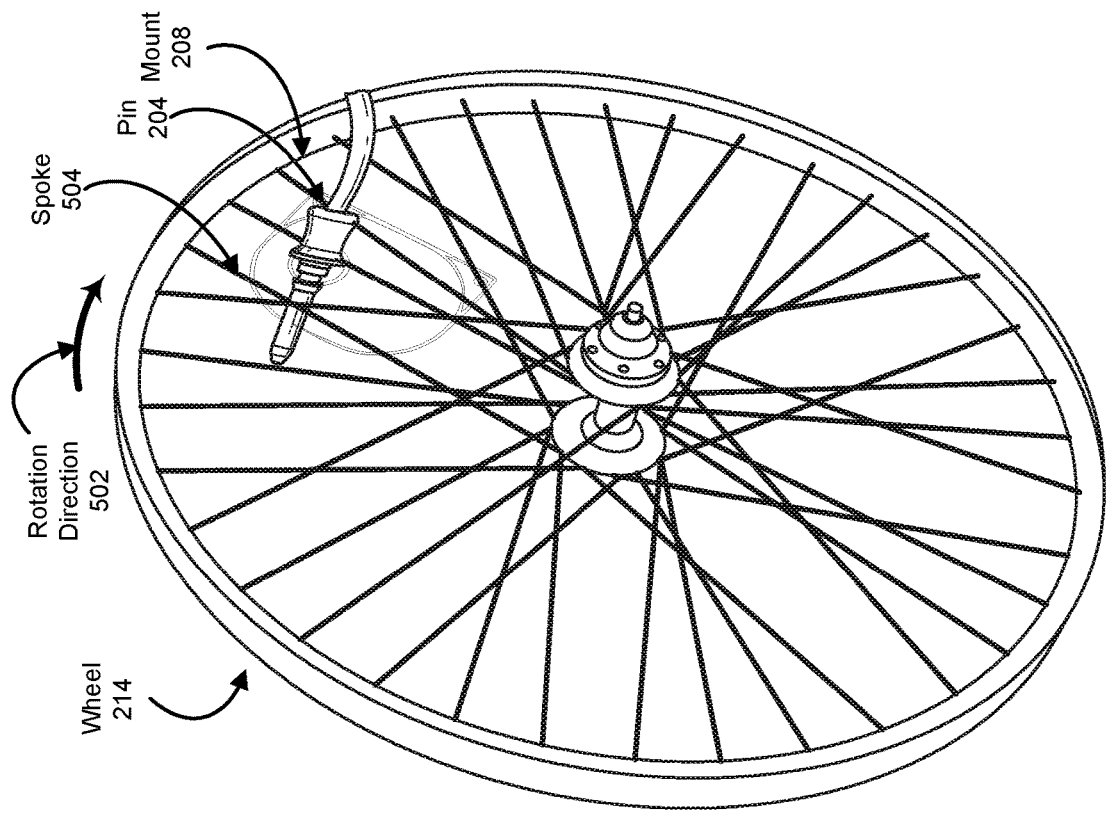
FIGS. 5A and 5B are illustrations of a wheel that is inhibited from rotating via the pin of a single-sided lock.
Figure 5A:
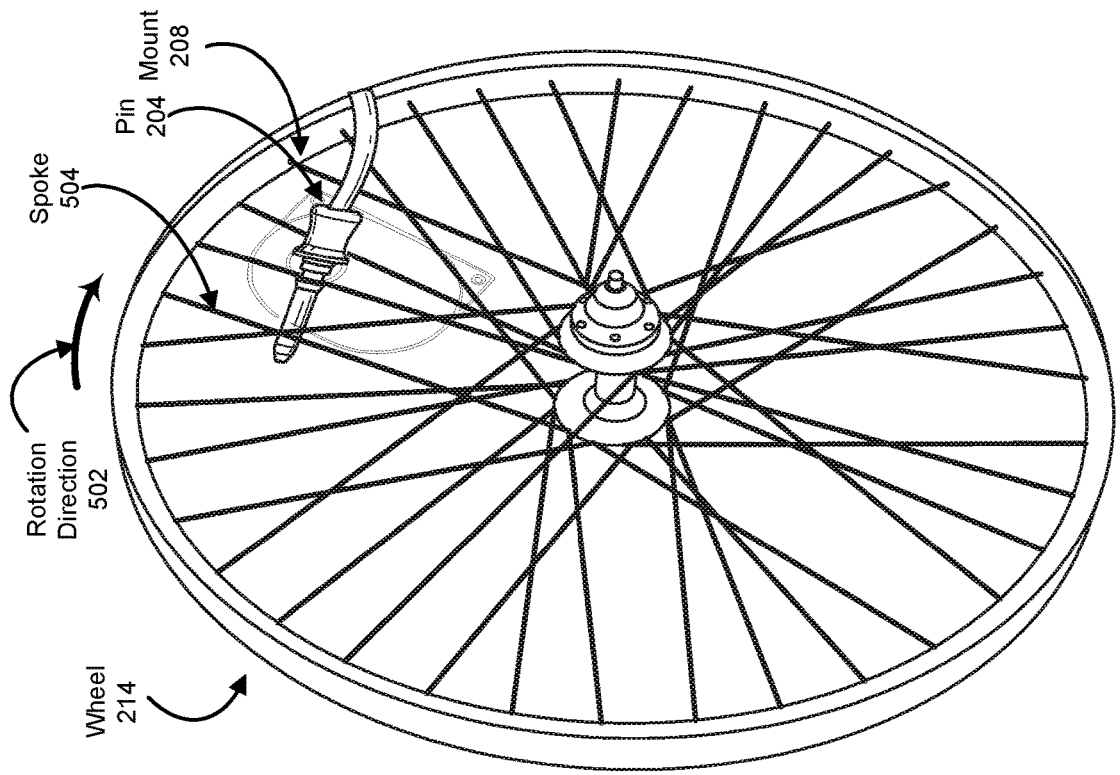

FIGS. 5A and 5B illustrate a wheel that is inhibited from rotating via the pin of a single-sided lock. As illustrated in FIG. 5A, wheel 214 may be free to rotate a small amount in rotation direction 502 before spoke 504 encounters pin 204. However, in FIG. 5B, after wheel 214 has rotated slightly in rotation direction 502, pin 204 inserted between two spokes of wheel 214 and held in place by mount 208 may inhibit further rotation of wheel 214 by preventing spoke 504 from passing pin 204 in due to the spokes being unable to rotate past pin 204, limiting the rotation of wheel 214 to a very small angle and impeding the movement of a wheeled vehicle of which wheel 214 is a part. For example, when wheel 214 starts to rotate in rotation direction 502, spoke 504 may come into contact with pin 204 and be unable to continue moving due to pin 204 being locked in place by mount 208, preventing wheel 214 from rotating any further in rotation direction 502. In some embodiments, pin 204 may be held in place by mount 208, not illustrated in FIG. 5. In some embodiments, pin 204 may, when inserted, go entirely through wheel 214 and emerge from the other side. In other embodiments, pin 204, when inserted, may reach far enough into wheel 214 to impede the movement of spokes but may not reach all the way through wheel 214 and/or may not emerge from the other side of wheel 214. Although illustrated as a bicycle wheel, in some embodiments, wheel 214 may represent a wheel of another type of wheeled vehicle, such as a scooter. Although a scooter wheel may have a smaller distance between the hub and the spokes and/or between individual spokes than a bicycle wheel, increasing the difficulty of fitting a lock component in between spokes, pin 204 may be dimensioned to fit between the spokes of a scooter wheel.

Figure 6A:
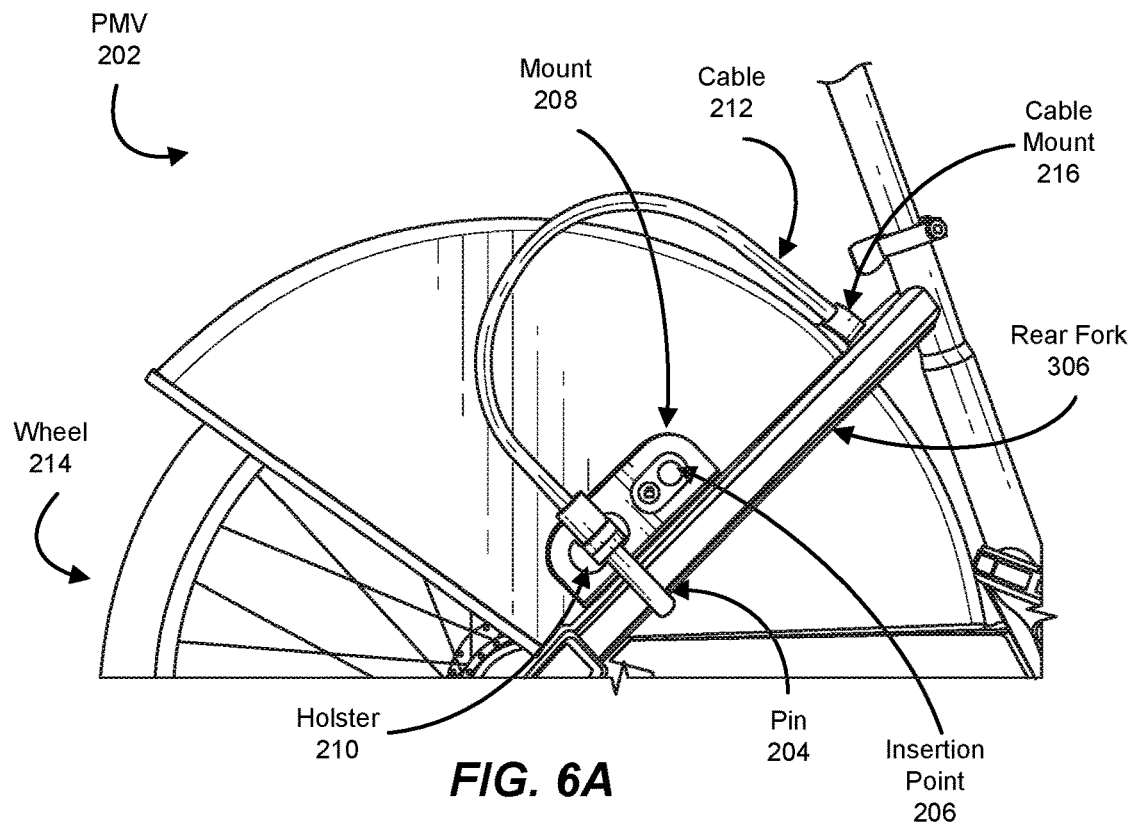
FIG. 6A is a side view of a PMV equipped with a single-sided lock with a rotating locking cable in an unlocked state.
Figure 6B:
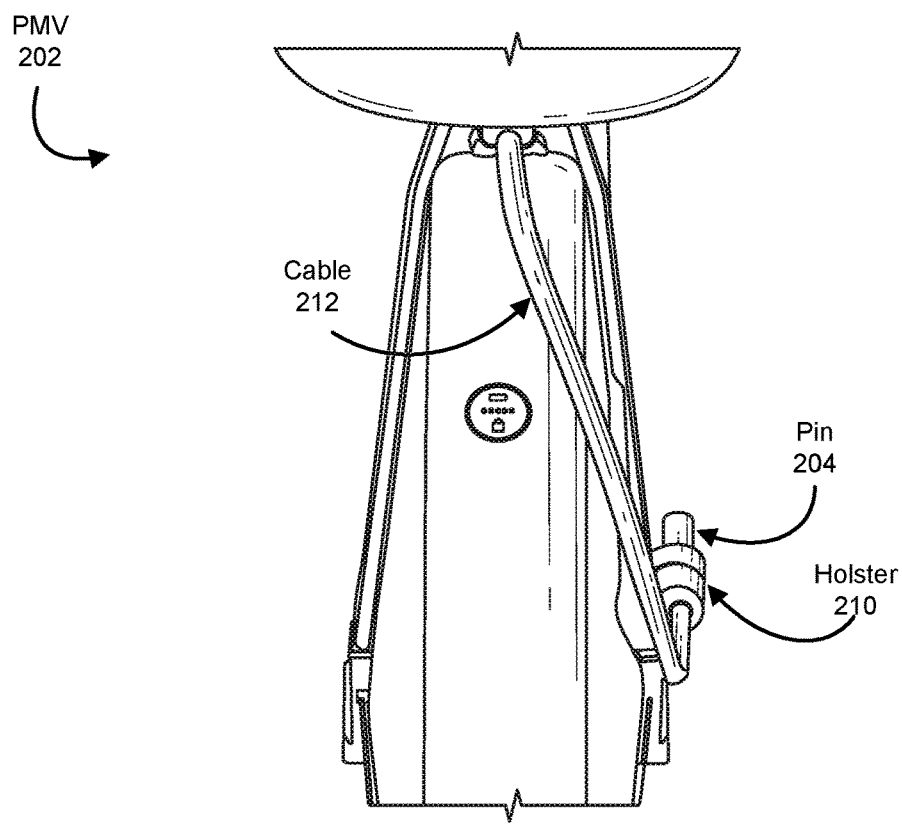
FIG. 6B is a rear view of a PMV equipped with a single-sided lock with a rotating locking cable in an unlocked state.

FIGS. 6A and 6B illustrate a single-sided lock in an unlocked state. In some examples, when pin 204 is not inserted into insertion point 206, pin 204 may be secured in holster 210 in mount 208. In one embodiment, holster 210 may form a hollow ring shape that is wide enough to permit the shaft of pin 204 but not the handle of pin 204. Additionally or alternatively, holster 210 may be a solid enclosure that completely covers pin 204 when pin 204 is inserted into holster 210. In one embodiment, holster 210 may be equipped with a mechanism such as a clasp, lock, and/or magnet that secures pin 204 in place in holster 210. Additionally or alternatively, holster 210 may be angled such that pin 204 is at least partially held in place in holster 210 by gravity and/or may be dimensioned such that pin 204 is at least partially held in place in holster 210 by friction. In some embodiments, holster 210 may be positioned and/or angled to reduce the chances of a holstered pin interfering with the mobility of a user of PMV 202 (e.g., by being in the way of the user's leg and/or catching on the user's clothing). In one embodiment, holster 210 may be angled such that pin 204, when inserted into holster 210, is perpendicular to rear fork 306. In some embodiments, cable 212 may be just long enough for pin 204 to reach holster 210 (given the flexibility of cable 212), reducing the chances that cable 212 will become tangled and/or otherwise interfere with the motion of PMV 202. In one embodiment, holster 210 may be positioned such that, when pin 204 is inserted into holster 210, cable 212 may issue from cable mount 216 in a direction that is parallel or at an acute angle to wheel 214, reducing the chances that cable 212 will become caught on an obstruction and unholster pin 214.

Figure 7A:
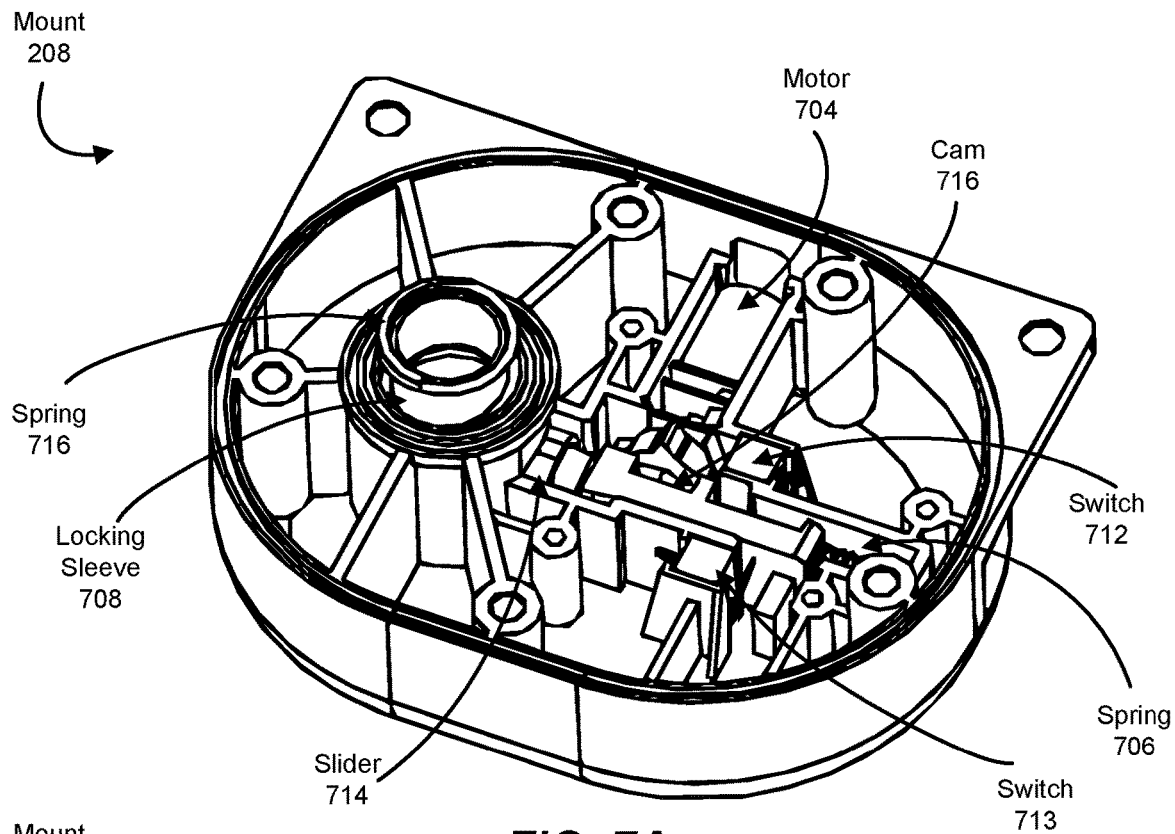
FIG. 7A is an isometric view of a mount component of a single-sided lock.
Figure 7B:
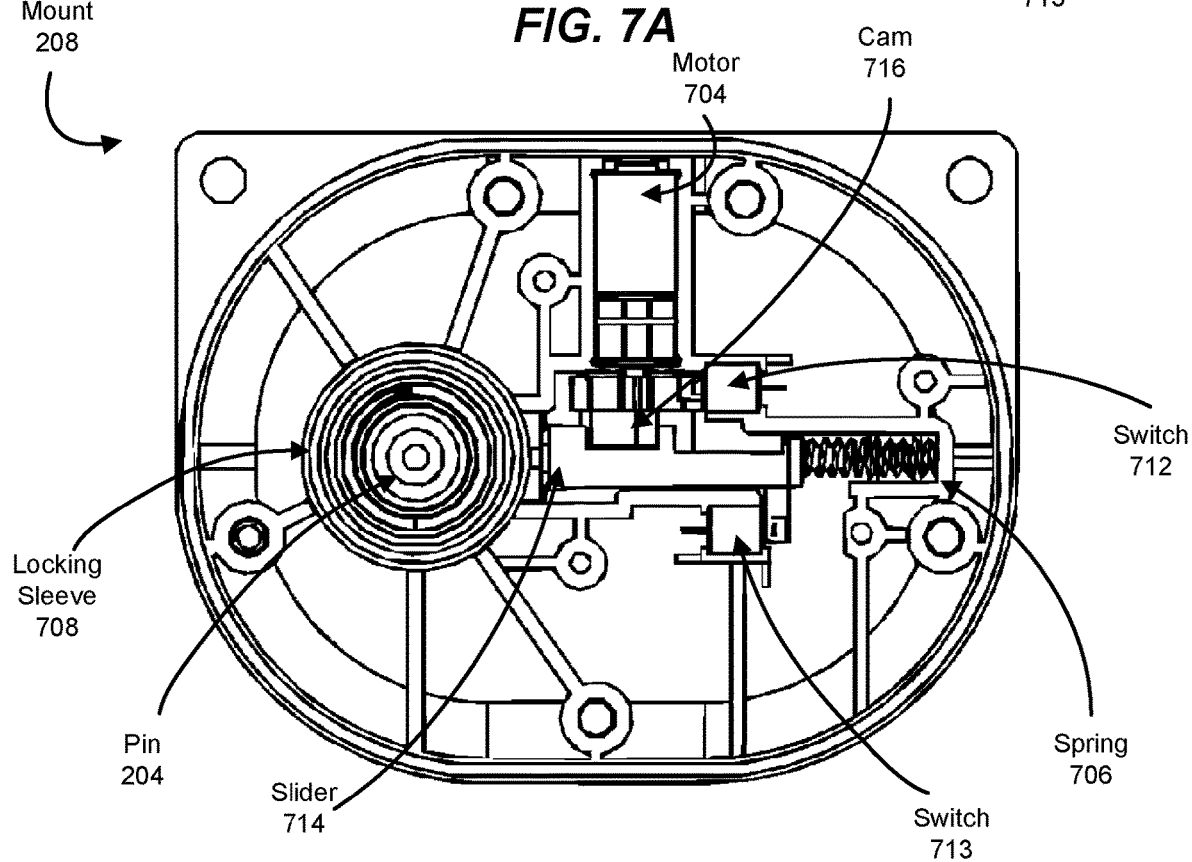
FIG. 7B is a top view of a mount component of a single-sided lock.

FIGS. 7A and 7B illustrate a mount component of a single-sided lock. As illustrated in FIGS. 7A and 7B, a mount 208 may have an insertion point that includes a locking sleeve 708 and/or a spring 718. In some embodiments, locking sleeve 708 may, in combination with a slider 714, function as a locking mechanism to secure a pin 204 in place when pin 204 is inserted. For example, locking sleeve 708 may have an opening that permits the head of slider 714 to enter into the insertion point and secure pin 204 in place. In one embodiment, slider 714 may be dimensioned to include a concavity that fits a cam (such as cam 716) and enables the cam to move the slider between extended and retracted positions by rotating the cam to push the slider forwards and/or backwards. Additionally or alternatively, slider 714 may be dimensioned with a slider head that fits a concavity within a pin (such as undercut 408 illustrated in FIG. 4), enabling slider 714 to prevent the pin from moving forward or backward when the slider head is inserted into the concavity within the pin. In some embodiments, a portion of slider 714 may be dimensioned to interact with a spring that, when expanded, pushes slider 714 into the extended position. In one embodiment, slider 714 may extend into insertion point 208 when extended (e.g., via an opening in locking sleeve 708) and/or may not extend into insertion point 208 when retracted. In some examples, spring 718 may compress when pin 204 is inserted and/or may propel pin 204 entirely or partially out of mount 208 when slider 714 is retracted from the insertion point. In some embodiments, a spring 706 may be compressed when slider 714 is retracted and/or may push slider 714 into place to lock pin 204 in place. In one embodiment, a switch 712 and/or a switch 713 may move in response to the motion of slider 714 and/or the motion of a motor 704 that moves and/or locks slider 714 in position. In some embodiments, motor 704 may rotate a cam 716 that moves slider 714 between locked (extended) and unlocked (retracted) positions. In some examples, switch 712 and/or switch 713 may, when depressed by one or more teeth of a gear 720 of motor 704, track and/or send information about the current position of slider 714 to another component. In one embodiment, switch 712 and/or switch 713 may include an electrical switch. Additionally or alternatively, the systems described herein may track the position of pin 204 by using a magnetic field detector in mount 208 to detect the position of a magnet in pin 204. slider 714 In some embodiments, mount 208 may include and/or communicate with a communication module that sends information about the position of pin 204 and/or slider 714 to a server. For example, the server may be part of a dynamic transportation matching system that manages a dynamic transportation network with which the wheeled vehicles to which the single-sided lock is affixed is associated. In some embodiments, the server may update a status of the wheeled vehicle relative to the dynamic transportation network (e.g., available, unavailable, and/or allocated) based at least in part on the position of pin 204 (e.g., by setting the status to available if pin 204 is in the locked position). In some examples, based on information about the position and/or motion of pin 204 that indicates that pin 204 has just been removed from the insertion point, motor 704 may rotate cam 716 to lock slider 714 into the extended position, preventing pin 204 from being re-inserted and returning the lock to the locked state. In some embodiments, motor 704 may rotate cam 716 to enable slider 714 to return to the retracted position after a set period of time after pin 204 has been removed from the insertion point and/or may enable slider 714 to return to the retracted position after receiving a signal (e.g., from a server and/or a lock and/or PMV component that communicates with a server). Additionally or alternatively, motor 704 may rotate cam 716 to enable slider 714 to return to the retracted position after one or more sensors (e.g., a magnetic field sensor that detects a magnet within pin 204) detects that pin 204 is no longer inserted into mount 208.

Figure 8:
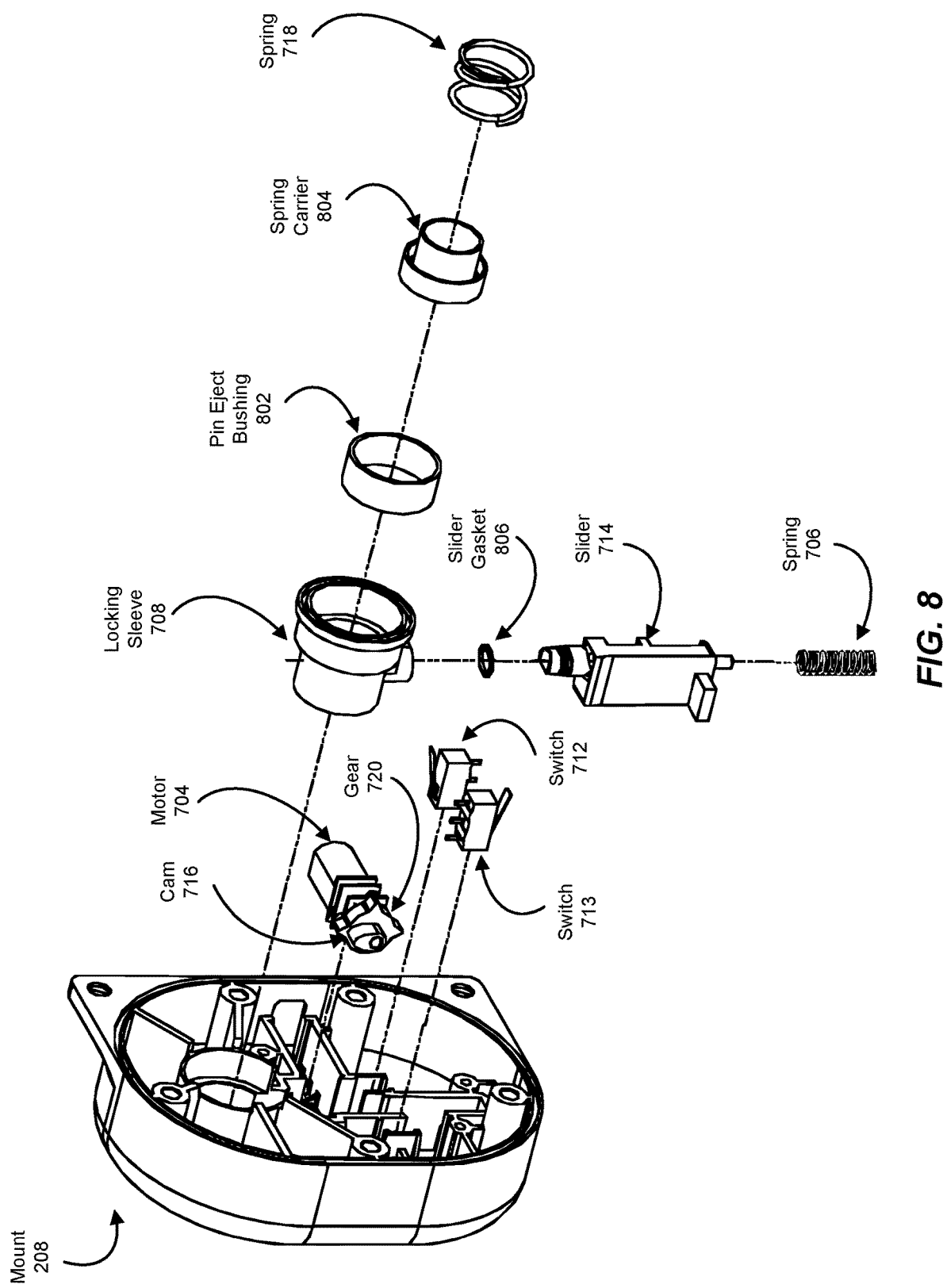
FIG. 8 is an exploded view of a mount component of a single-sided lock.

FIG. 8 is an exploded view of mount 208. As illustrated in FIG. 8, locking sleeve 708 may house a pin eject bushing 802 and/or spring carrier 804 that may work in conjunction with spring 718 to eject the pin from mount 208 by enabling spring 706 to, when expanded, eject the pin from mount 208. In some embodiments, slider 714 may be coupled to a slider gasket 806 that helps prevent liquid from entering mount 208 by forming a watertight seal with mount 208 as slider 714 moves between retracted and extended states. In one embodiment, switch 712 and switch 713 may separately track the movement and/or position of motor 704 and/or slider 714, respectively. For example, switch 712 may track the position of motor 704 to determine at what position motor 704 must stop to be in each lock state. In one example, switch 713 may track the position of slider 714. When slider 714 is in the retracted state, switch 713 may be open because motor 704 may, via cam 716, be pulling the slider 714 into a housing for slider 714. When slider 714 is in the extended state, spring 706 may pushes slider 714 outward and into switch 713, causing switch 713 to be closed when slider 714 is in the extended state.

Figure 9:
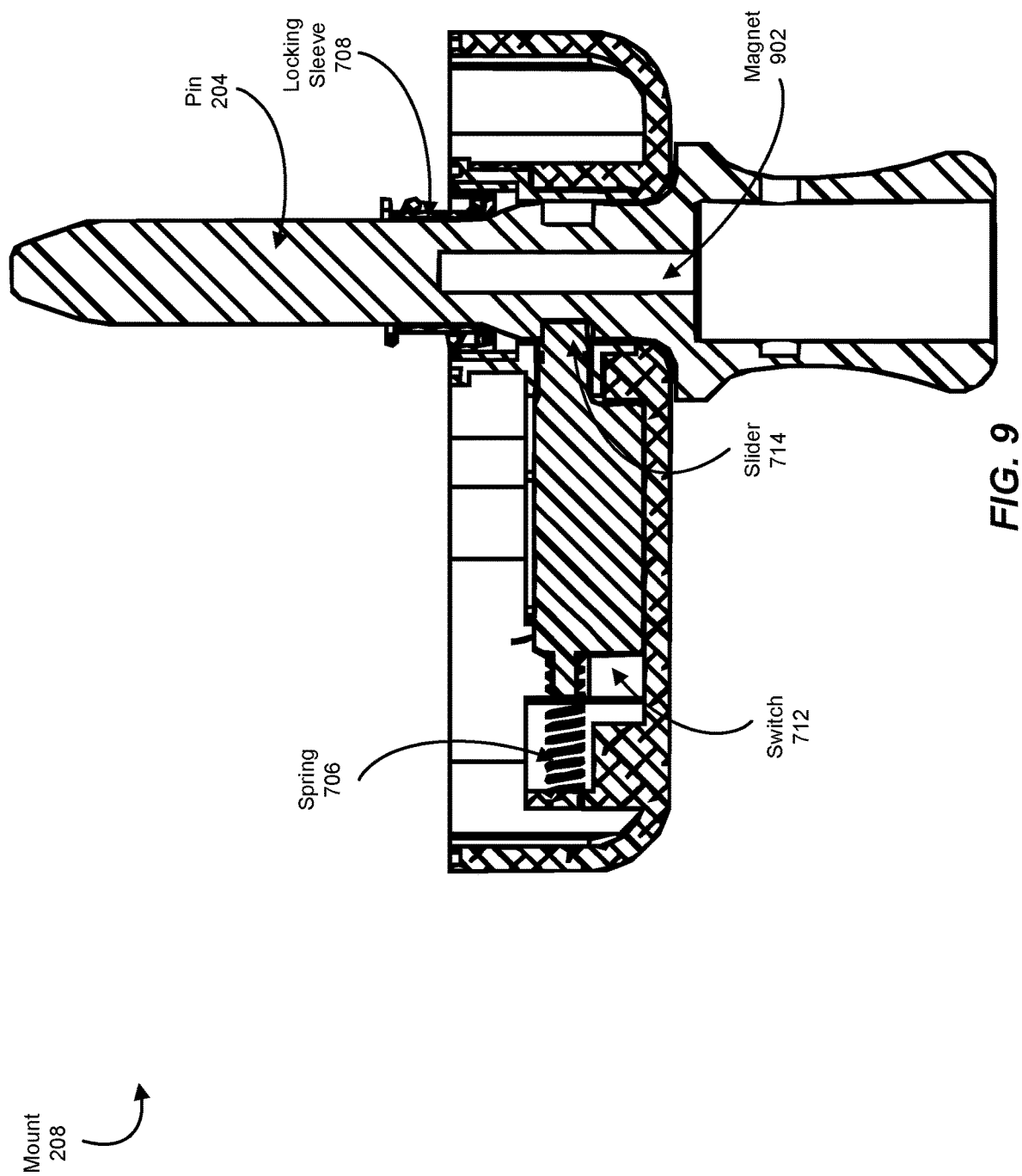
FIG. 9 is a side view of a mount component of a single-sided lock.

FIG. 9 is a side view of mount 208 with pin 204 inserted. As illustrated in FIG. 9, with pin 204 inserted into mount 208, slider 714 may lock into place in a groove within pin 204. With slider 714 extended, spring 706 may also be extended. In some examples, switch 713 may change position based on the position of slider 714. In some embodiments, pin 204 may include a beveled edge and/or undercut such that, when pin 204 is inserted into mount 208, slider 714 is initially pushed out of the way by pin 204 into the retracted position, causing spring 706 to coil, and is then pushed into the extended position by spring 706 once pin 204 is fully inserted such that the undercut of pin 204 lines up with slider 714. Alternatively, pin 204 may have a beveled tip and/or may not have a bevel before the undercut.

FIGS. 10A, 10B, 10C, and 10D illustrate a slider in four different positions. In FIG. 10A, at position 1002, slider 714 is fully extended. In some embodiments, slider 714 may be pushed into the extended position by spring 706. Additionally or alternatively, motor 704 (not visible) may lock slider 714 into the extended position, preventing pin 208 from being inserted into insertion point 206 past bevel 406 (and thus preventing the lock from locking). In one embodiment, spring 716 may be partially compressed by pin 204 as pin 204 is partially inserted into insertion point 206.

In FIG. 10B, at position 1004, pin 204 may be inserted farther into insertion point 206 than in position 1002, such that bevel 406 contacts slider 714 and pushes slider 714 into a retracted position, compressing spring 706. In some embodiments, pin 204 may also further compress spring 716. In FIG. 10C, at position 1006, pin 204 may be fully inserted into insertion point 206 such that bevel 406 has moved past the head of slider 714. In one embodiment, spring 706 may expand, pushing the head of slider 714 into undercut 408 in pin 204. In some examples, motor 704 may lock slider 714 into place, preventing pin 204 from being removed from insertion point 206 due to bevel 406 being unable to travel past the head of slider 714 (and therefore locking the lock). In some embodiments, pin 204 may fully compress spring 716 when pin 204 is fully inserted into insertion point 206.

In FIG. 10D, at position 1010, motor 704 may move slider 714 into the retracted position, compressing spring 706 and removing slider 714 from undercut 408 of pin 204. In one embodiment, spring 716 may expand, ejecting pin 204 from insertion point 206 (and unlocking the lock). In some embodiments, motor 704 may then lock slider 714 into an extended state, preventing the immediate re-insertion of pin 204 into insertion point 206.

Figure 11A:
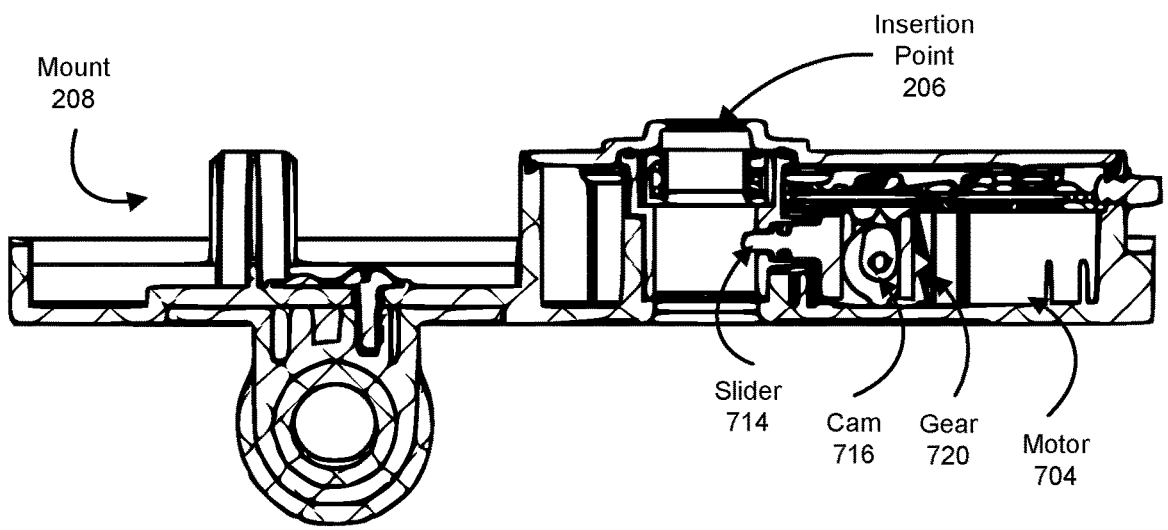
FIGS. 11A, 11B, and 11C are illustrations of cutaway views of the action of a cam at different positions during the operation of a single-sided lock.
Figure 11B:
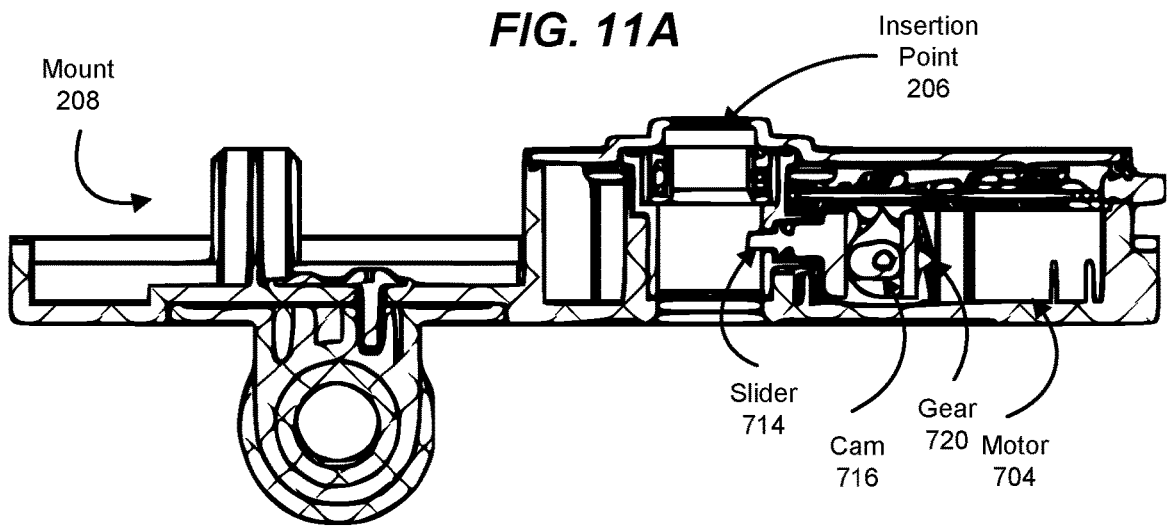
Figure 11C:
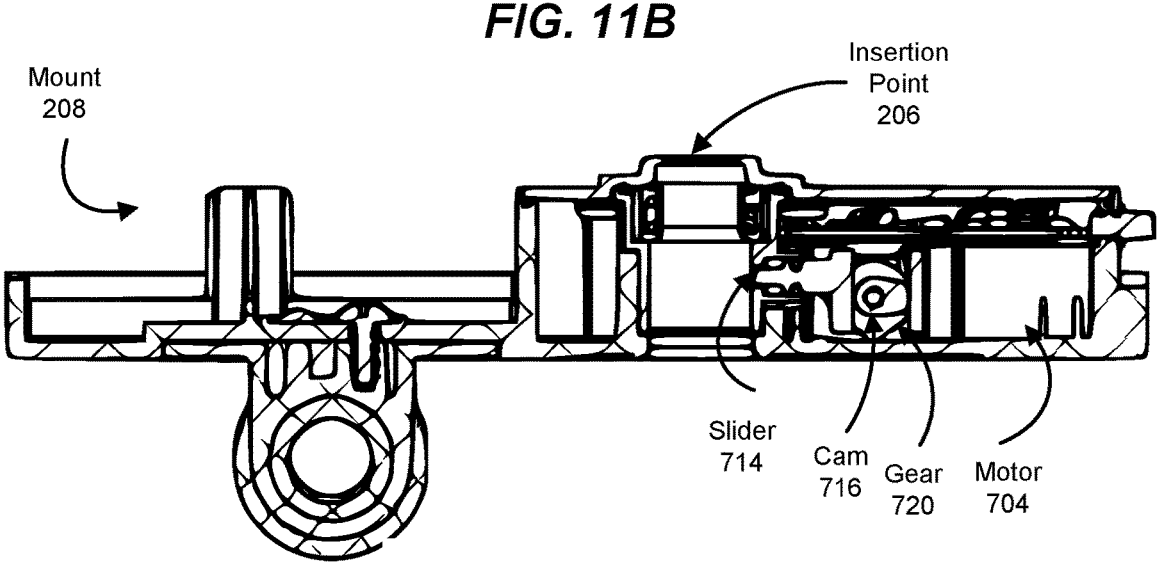

FIGS. 11A, 11B, and 11C illustrate the motion of a motor-driven cam at different positions. In some embodiments, cam 716 may be oblong in shape and/or may be rotated via the action of motor 704. In some embodiments, cam 716 may be adjacent to gear 720 of motor 704 that may have three teeth at ninety-degree angles and one surface free of teeth and may be rotated in conjunction with cam 716. In FIG. 11A, cam 716 may be oriented vertically along the long axis of cam 716 such that cam 716 is not in contact with slider 714, enabling slider 714 to move independently of cam 716. In some examples, the action of a spring (e.g., spring 706 illustrated in FIG. 6) may push slider 714 into the extended position without cam 716 acting on slider 714 and/or preventing the motion of slider 714. For example, if a pin is not currently inserted into insertion point 208, motor 704 rotate cam 716 so that cam 716 does not have contact with slider 714, enabling slider 714 to be pushed from the extended position to the retracted position by the insertion of a pin and/or to be pushed (e.g., via spring 706) from the retracted position to the extended position once a concavity of the pin (e.g., undercut 408 illustrated in FIG. 4) lines up with slider 714. In some examples, motor 704 may then rotate cam 716 such that cam 716 is oriented horizontally and in contact with slider 714, locking slider 714 into the extended position (thus locking the lock).

In FIG. 11B, cam 716 may have, via rotation into a horizontal orientation with the longest portion of cam 716 oriented towards insertion point 208, driven slider 714 into the extended position, where part of slider 714 extends into insertion point 206 of mount 208. In some embodiments, motor 704 may lock cam 716 in place, causing cam 716 to lock slider 714 into the extended position. If a pin has previously been inserted into insertion point 208, slider 714 may lock the pin in place (i.e., the single-sided lock may be locked). If no pin is inserted into insertion point 206 and slider 714 is locked into the extended position by the rotation of cam 716 as driven by motor 704, slider 714 may prevent the insertion of a pin and/or other objects into insertion point 206. In some examples, this configuration may prevent a user from accidentally re-locking the lock by re-inserting the pin after having previously unlocked the lock and removed the pin. In some embodiments, motor 704 may rotate gear 720 while rotating cam 716, causing one or more teeth of gear 720 to depress the plate of a switch (e.g., switch 712 illustrated in FIG. 7) that detects information about the rotation of cam 716. Additionally or alternatively, the motion of slider 714 may open or close switch 713 that detects the position of slider 714.

In FIG. 11C, cam 716 has, via rotating into a horizontal orientation such that the longest portion of cam 716 is oriented away from insertion point 206, driven slider 714 into the retracted position, where slider 714 is not protruding into insertion point 206 of mount 208. In some examples, motor 704 may lock cam 716 into this rotational position and therefore lock slider 714 into the retracted position. In some embodiments, if a pin is currently inserted into insertion point 206, rotating cam 716 to move slider 714 into the retracted position may enable the pin to be withdrawn from insertion point 208 (unlocking the lock).

FIG. 12 illustrates a slider ring component of a single-sided lock. In some embodiments, slider 714 may be coupled to a gasket 706. In one embodiment, gasket 706 may be a rubber o-ring. In some examples, gasket 706 may move with slider 714, preventing liquid from entering the mount at the insertion point by forming a physical barrier where there might otherwise exist a void that liquid could enter.

Figure 13:
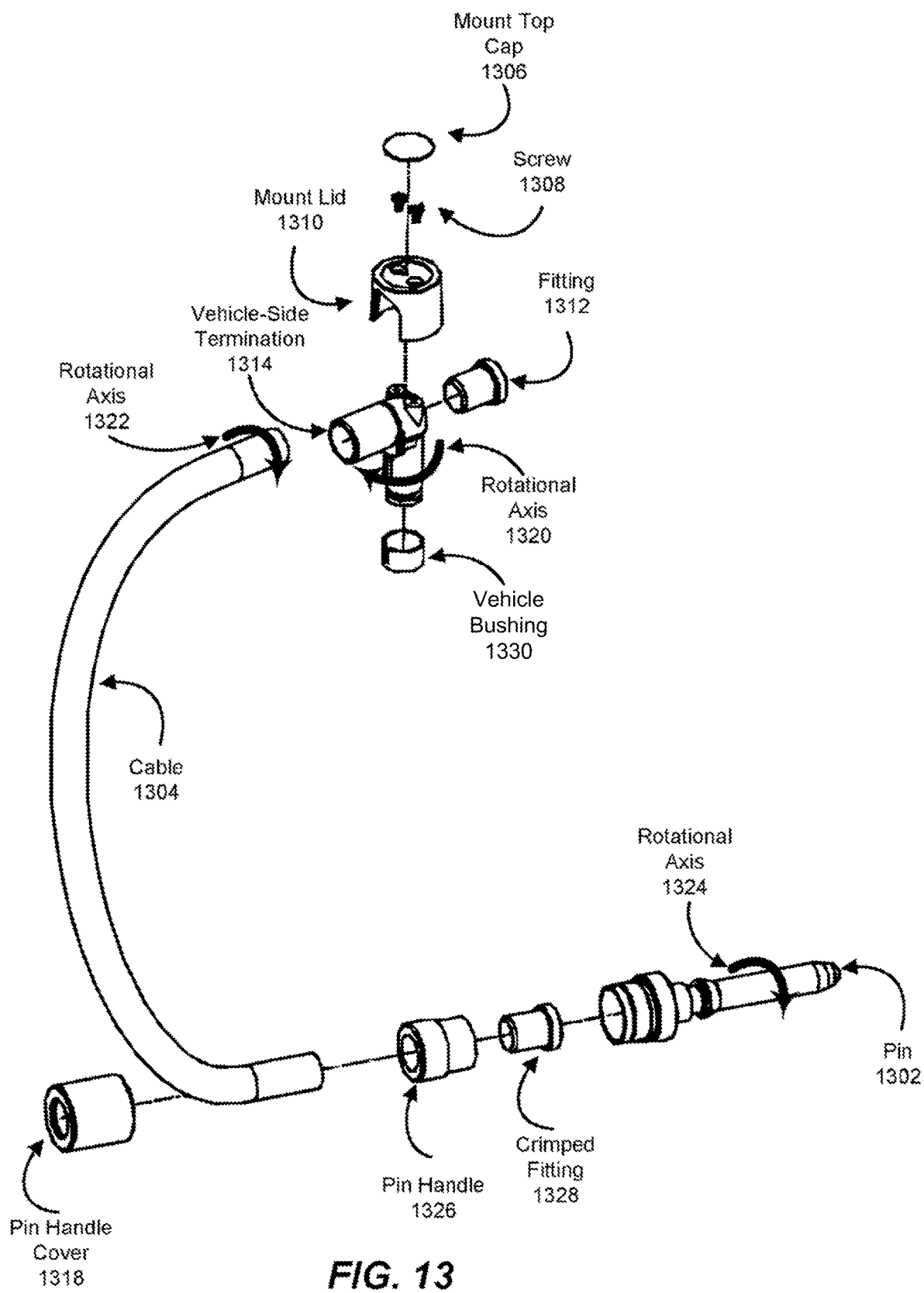
FIG. 13 is an exploded view of a cable component of a single-sided lock.

FIG. 13 is an exploded view of a cable assembly for a single-sided lock. As illustrated in FIG. 13, in some embodiments, a cable assembly for a cable that attaches the pin of a single-sided lock to a vehicle may include a vehicle-side termination 1314 anchored to the vehicle by a vehicle bushing 1330 and/or capped by a mount lid 1310 and/or a mount cap top 1306 held in place by one or more screws 1308. In one embodiment, vehicle-side termination 1314 may include two circular attachments joined at a substantially perpendicular angle, at least one of which includes threading to enable attachment to components with matching but reversed threading. In one embodiment, mount lid 1310 and/or mount cap top 1306 may be circular with smooth sides, preventing the cable assembly from catching on objects (e.g., the clothing of an operator of a PMV to which the cable assembly is affixed) and/or improving aesthetics. In some embodiments, vehicle-side termination 1314 may also be coupled to a fitting 1312. In one embodiment, a cable 1304 may be coupled to vehicle-side termination 1314 on one end and a pin 1302 on the other end. In some embodiments, a pin handle cover 1318 may be coupled to pin 1302 where pin 1302 meets cable 1304 and/or a pin handle 1326. In some embodiments, vehicle-side termination 1314 may rotate relative to the vehicle to which vehicle-side termination 1314 is affixed around rotational axis 1320. For example, vehicle-side termination 1314 may rotate on a plane substantially perpendicular to the surface of the vehicle to which vehicle-side termination 1314 is attached. In some embodiments, cable 1304 may rotate within and/or relative to vehicle-side termination 1314 around rotational axis 1322. In one embodiment, rotational axis 1320 may be substantially perpendicular to rotational axis 1322. Additionally or alternatively, pin 1302 may rotate relative to cable 1304 and/or pin handle cover 1318 around rotational axis 1324. In some embodiments, a crimped fitting 1328 may facilitate the rotation of pin 1302 relative to cable 1304. In combination with the flexibility of cable 1304, rotational axes 1320, 1322, and/or 1324 may facilitate easy movement of pin 1302 into and out of an insertion point and/or holster. In some embodiments, during assembly, cable 1304 may passes through pin handle 1326 and terminate at crimped fitting 1328, sandwiching pin handle 1326 between cable 1304 and crimped fitting 1328 but allowing for cable 1304 to rotate on rotational axis 1324. Pin handle 1326 may then be screwed onto pin 1302 and/or welded in place, creating a permanent assembly between the pin handle 1326 and pin 1302 so that pin 1302 is able to rotate freely while having a permanent attachment to cable 1304.

Figure 14:
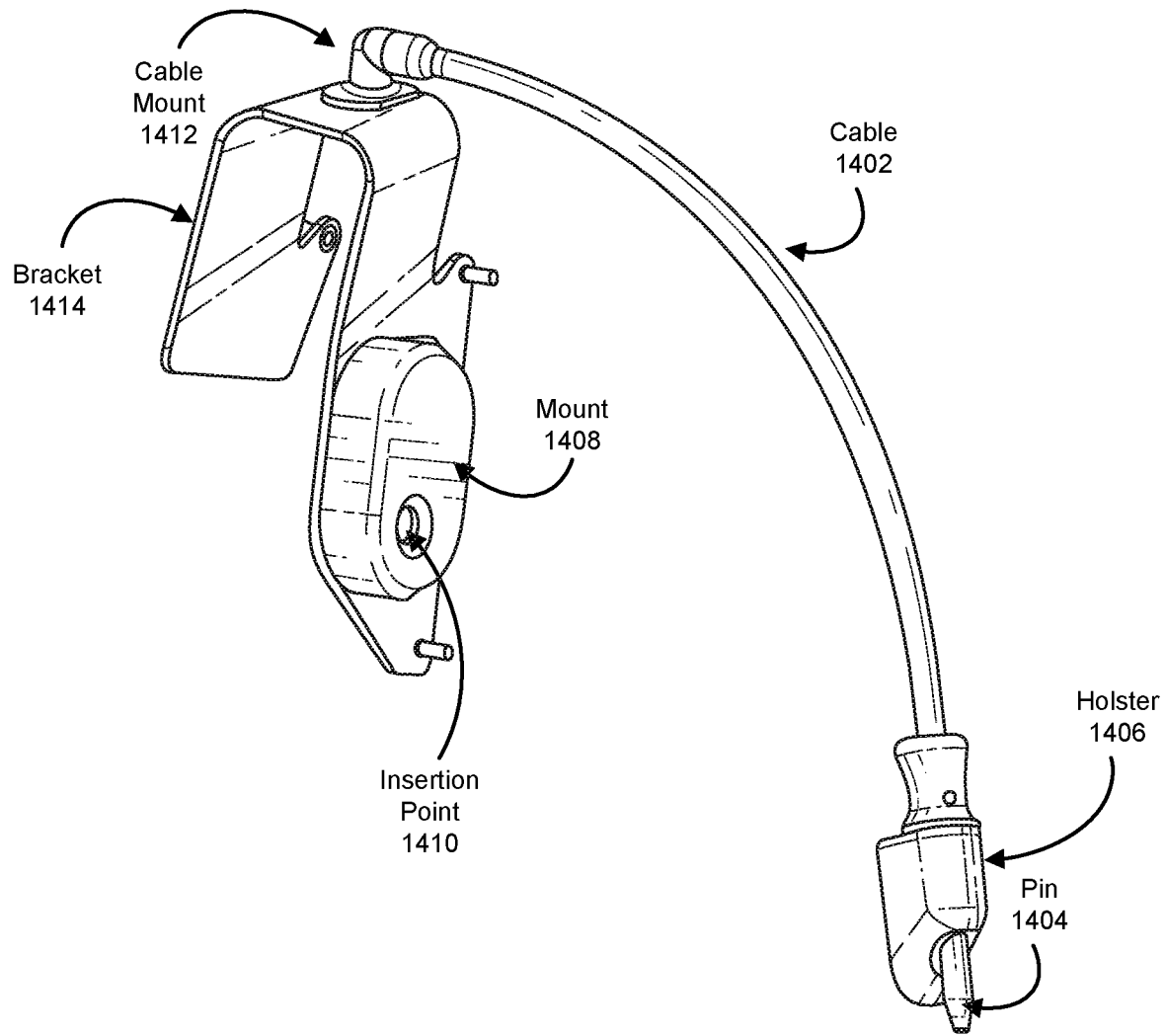
FIG. 14 is an illustration of a mount assembly for a single-sided lock.

FIG. 14 illustrates a mount assembly for a single-sided lock. In some embodiments, a mount assembly may include a bracket 1414 that secures the mount assembly to the fender and/or rigid frame of a wheeled vehicle such as a bicycle. In some embodiments, bracket 1414 may include a thin sheet of metal, plastic, and/or other material that is shaped with two substantially perpendicular angles such that bracket 1414 fits directly over the fender of a wheeled vehicle with minimal space between bracket 1414 and the fender. In one embodiment, bracket 1414 may include multiple attachment points such as screws that secure bracket 1414 to the fender and/or other structural component of the wheeled vehicle. In one embodiment, bracket 1414 may be coupled to a mount 1408 such that an insertion point 1410 is positioned adjacent to a wheel. In some embodiments, mount 1408 may be integral to bracket 1414. In some embodiments, bracket 1414 may include a cable mount 1412 that is coupled to a cable 1402 that secures a pin 1404 to the mount assembly. In some embodiments, the mount assembly may include a holster 1406 that is not directly attached to bracket 1414 and/or that secures pin 1404 in place when pin 1404 is not inserted into insertion point 1410. In some embodiments, holster 1406 may be affixed to and/or integral to bracket 1414. In some embodiments, cable 1402 may be dimensioned such that cable 1402 is long enough to wrap around a bike rack, pole, tree, and/or other stationary object and still insert pin 1404 into insertion point 1410. For example, cable 1402 may be one foot long, eighteen inches long, two feet long, and/or three feet long. In some embodiments, pin 1404 may be dimensioned such that when pin 1404 is fully inserted into insertion point 1410, pin 1404 prevents full rotation a wheel. For example, pin 1404 may be two inches long, three inches long, or four inches long. In some embodiments, bracket 1414 may be dimensioned based at least in part on the dimensions of the vehicle to which bracket 1414 will be attached. For example, the height of bracket 1414 may be based on the diameter of the wheel of the vehicle and/or the way in which the wheel and/or bracket 1414 is mounted to the frame of the vehicle. In some embodiments, mount 1408 may be dimensioned to house all of the components within mount 1408 (e.g., as illustrated in FIGS. 7 and 8).

Figure 15:
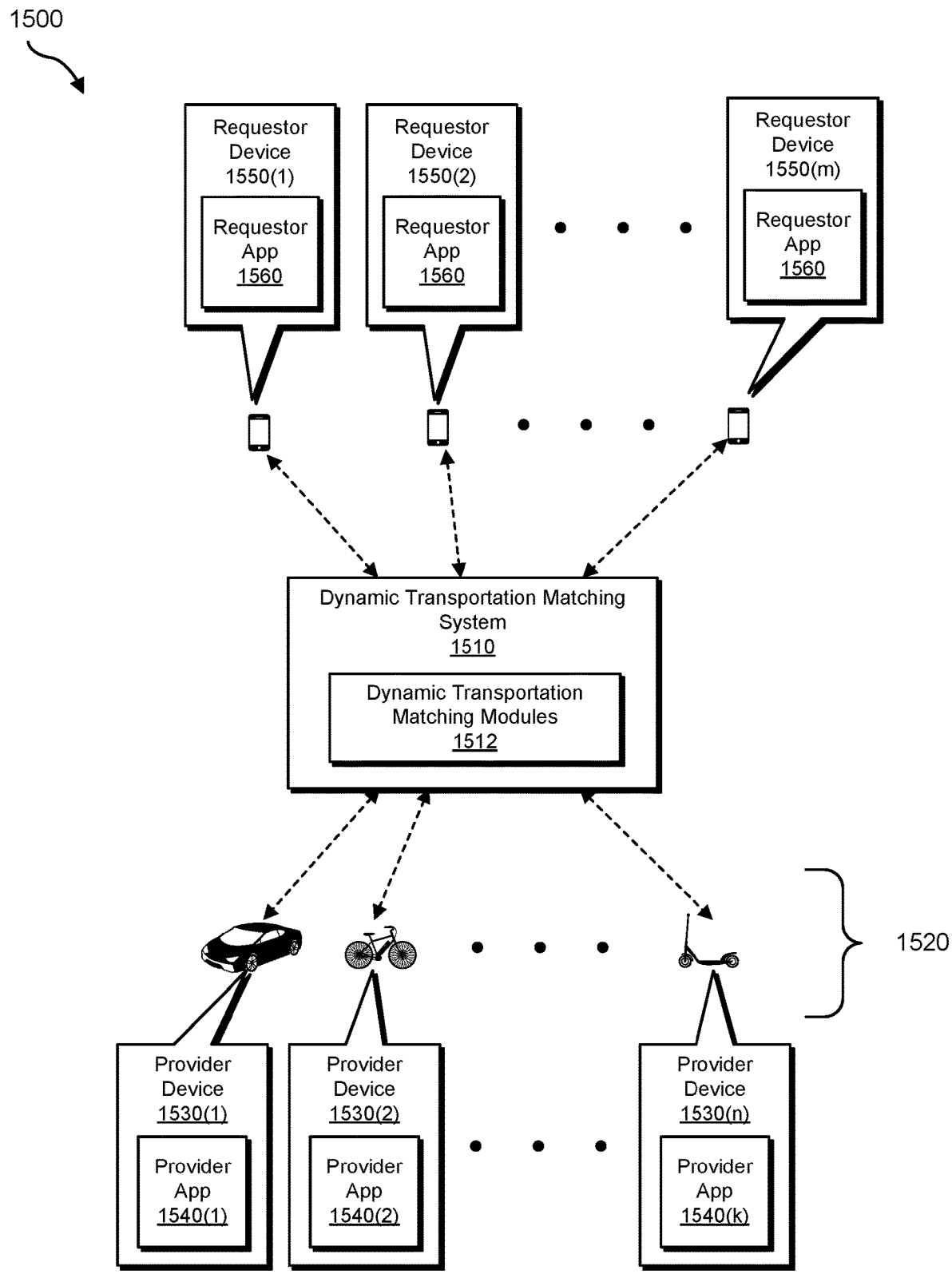
FIG. 15 is a block diagram of an example system for a dynamic transportation network.

FIG. 15 illustrates an example system 1500 for matching transportation requests with a dynamic transportation network that includes personal mobility vehicles and/or other wheeled vehicles. As shown in FIG. 15, a dynamic transportation matching system 1510 may be configured with one or more dynamic transportation matching modules 1512 that may perform one or more of the steps described herein. Dynamic transportation matching system 1510 may represent any computing system and/or set of computing systems capable of matching transportation requests. Dynamic transportation matching system 1510 may be in communication with computing devices in each of a group of vehicles 1520. Vehicles 1520 may represent any vehicles that may fulfill transportation requests. In some examples, vehicles 1520 may include disparate vehicle types and/or models. For example, vehicles 1520 may include road-going vehicles and personal mobility vehicles. In some examples, some of vehicles 1520 may be standard commercially available vehicles. According to some examples, some of vehicles 1520 may be owned by separate individuals (e.g., transportation providers). Furthermore, while, in some examples, many or all of vehicles 1520 may be human-operated, in some examples many of vehicles 1520 may also be autonomous (or partly autonomous). Accordingly, throughout the instant disclosure, references to a "transportation provider" (or "provider") may, where appropriate, refer to an operator of a human driven vehicle, an autonomous vehicle control system, an autonomous vehicle, an owner of an autonomous vehicle, an operator of an autonomous vehicle, an attendant of an autonomous vehicle, a vehicle piloted by a requestor, and/or an autonomous system for piloting a vehicle. While FIG. 15 does not specify the number of vehicles 1520, it may be readily appreciated that the systems described herein are applicable to hundreds of vehicles, thousands of vehicles, or more. In one example, dynamic transportation matching system 1510 may coordinate transportation matchings within a single region for 50,000 vehicles or more on a given day. In some examples, vehicles 1520 may collectively form a dynamic transportation network that may provide transportation supply on an on-demand basis to transportation requestors.

As mentioned above, dynamic transportation matching system 1510 may communicate with computing devices in each of vehicles 1520. The computing devices may be any suitable type of computing device. In some examples, one or more of the computing devices may be integrated into the respective vehicles 1520. In some examples, one or more of the computing devices may be mobile devices. For example, one or more of the computing devices may be smartphones. Additionally or alternatively, one or more of the computing devices may be tablet computers, personal digital assistants, or any other type or form of mobile computing device. According to some examples, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or provider for a transportation matching application, a navigation application, and/or any other application suited for the use of requestors and/or providers). Additionally or alternatively, one or more of the computing devices may be devices suitable for installing in a vehicle and/or may be a vehicle's computer that has a transportation management system application installed on the computer in order to provide transportation services to transportation requestors and/or communicate with dynamic transportation matching system 1510.

As shown in FIG. 15, vehicles 1520 may include provider devices 1530(1)-(n) (e.g., whether integrated into the vehicle, permanently affixed to the vehicle, temporarily affixed to the vehicle, worn by a driver of the vehicle, etc.). In some examples, provider devices 1530 may include a provider apps 1540(1)-(k). Provider apps 1540(1)-(k) may represent any application, program, and/or module that may provide one or more services related to operating a vehicle and/or providing transportation matching services. For example, provider apps 1540(1)(k) may include a transportation matching application for providers and/or one or more applications for matching PMVs with requestor devices. In some embodiments, different types of provider vehicles may be provisioned with different types of provider devices and/or different provider applications. For example, PMVs may be provisioned with provider devices that are configured with a provider application that enables transportation requestors to reserve and/or operate the PMV while road-constrained vehicles (e.g., cars) may be provisioned with provider devices that are configured with a provider application that enables provider vehicle operators (e.g., transportation providers) to respond to requests from transportation requestors. In some examples, provider applications 1540(1)-(k) may match the user of provider apps 1540(1)-(k) (e.g., a transportation provider) with transportation requestors through communication with dynamic transportation matching system 1510. In addition, and as is described in greater detail below, provider apps 1540(1)-(k) may provide dynamic transportation management system 1510 with information about a provider (including, e.g., the current location of the provider and/or vehicle) to enable dynamic transportation management system 1510 to provide dynamic transportation matching and/or management services for the provider and one or more requestors. In some examples, provider apps 1540(1)-(k) may coordinate communications and/or a payment between a requestor and a provider. According to some embodiments, provider apps 1540(1)-(k) may provide a map service, a navigation service, a traffic notification service, and/or a geolocation service.

Additionally, as shown in FIG. 15, dynamic transportation matching system 1510 may communicate with requestor devices 1550(1)-(m). In some examples, requestor devices 1550 may include a requestor app 1560. Requestor app 1560 may represent any application, program, and/or module that may provide one or more services related to requesting transportation matching services. For example, requestor app 1560 may include a transportation matching application for requestors. In some examples, requestor app 1560 may match the user of requestor app 1560 (e.g., a transportation requestor) with transportation providers through communication with dynamic transportation matching system 1510. In addition, and as is described in greater detail below, requestor app 1560 may provide dynamic transportation management system 1510 with information about a requestor (including, e.g., the current location of the requestor) to enable dynamic transportation management system 1510 to provide dynamic transportation matching services for the requestor and one or more providers. In some examples, requestor app 1560 may coordinate communications and/or a payment between a requestor and a provider. According to some embodiments, requestor app 1560 may provide a map service, a navigation service, a traffic notification service, and/or a geolocation service.

Embodiments of the instant disclosure may include or be implemented in conjunction with a dynamic transportation matching system. A transportation matching system may arrange transportation on an on-demand and/or ad-hoc basis by, e.g., matching one or more transportation requestors with one or more transportation providers. For example, a transportation matching system may provide one or more transportation matching services for a ridesharing service, a ridesourcing service, a taxicab service, a car-booking service, an autonomous vehicle service, a personal mobility vehicle service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The transportation matching system may be implemented on various platforms, including a requestor-owned mobile device, a computing system installed in a vehicle, a requestor-owned mobile device, a server computer system, or any other hardware platform capable of providing transportation matching services to one or more requestors and/or providers.

Figure 16:
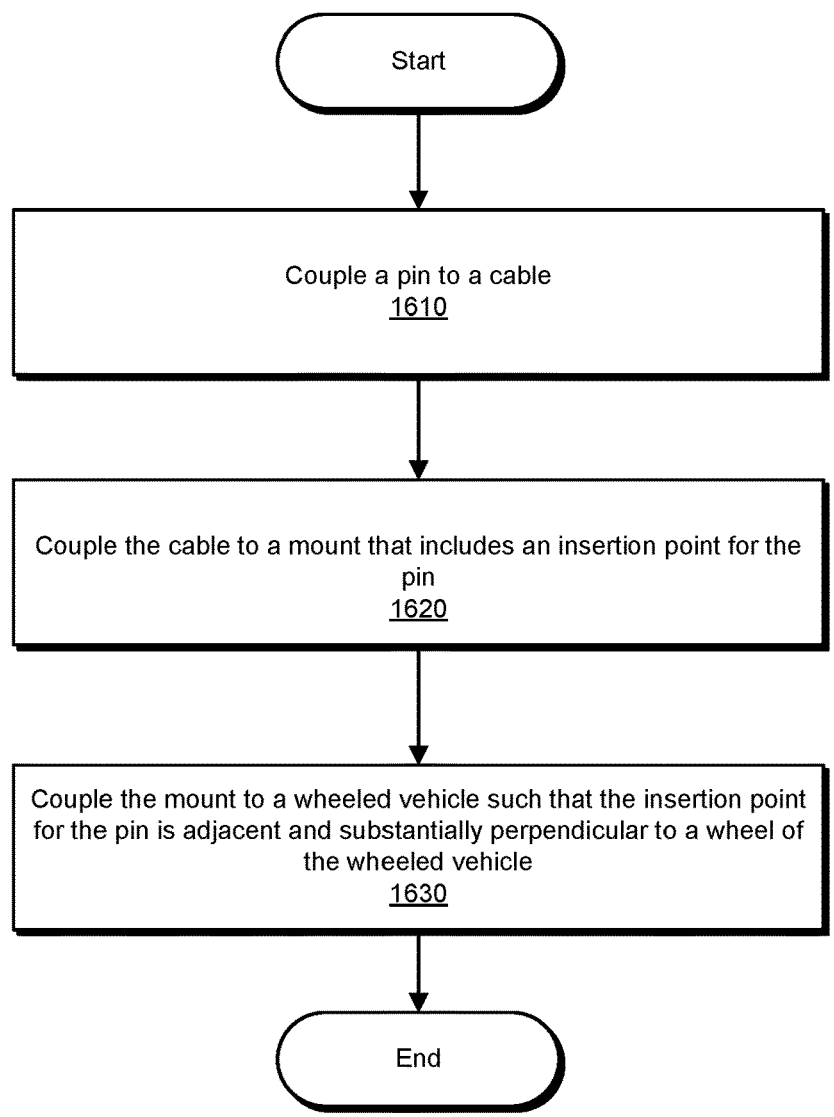
FIG. 16 is a flow diagram of an example method for assembling a rotating anchor cable for a single-sided lock.

FIG. 16 illustrates an example method 1600 for constructing a single-sided lock. As illustrated in FIG. 16, at step 1610, one or more of the systems described herein may couple a pin to a cable. At step 1620, one or more of the systems described herein may couple the cable to a mount that includes an insertion point for the pin. At step 1630, one or more of the systems described herein may couple the mount to a wheeled vehicle such that the insertion point for the pin is adjacent and substantially perpendicular to a wheel of the wheeled vehicle. In some embodiments, one or more of the systems described herein may detect, via a sensor within the mount (e.g., a switch), that the pin has been inserted into the insertion point and/or send, to a server, a message that the pin has been inserted into the insertion point. Additionally or alternatively, one or more of the systems described herein may detect, via a sensor within the mount, that the pin has been removed from the insertion point and/or send, to a server, a message that the pin has been removed from the insertion point.

Figure 17:
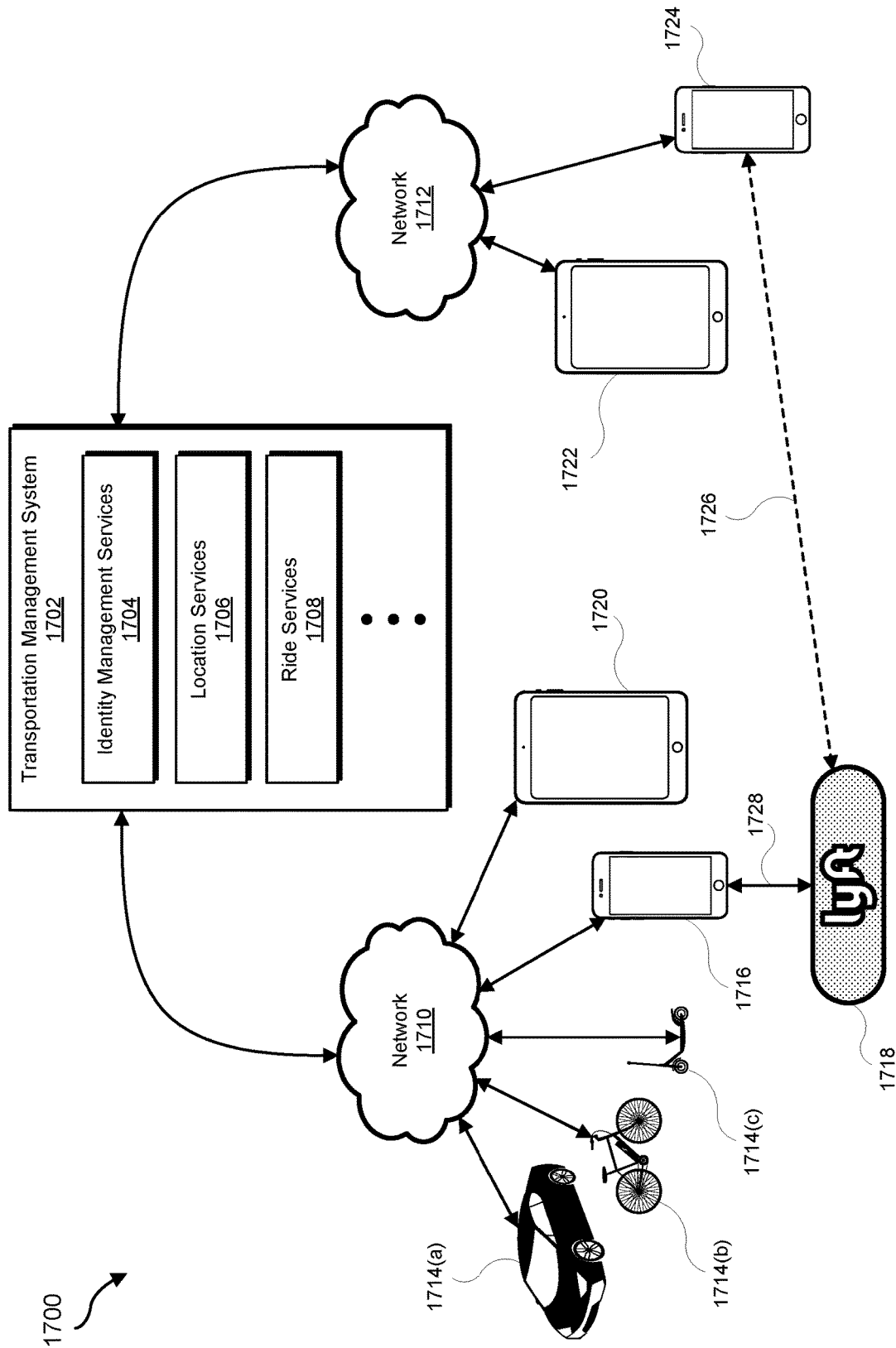
FIG. 17 is an illustration of an example requestor/provider management environment.

FIG. 17 shows a transportation management environment 1700, in accordance with various embodiments. As shown in FIG. 17, a transportation management system 1702 may run one or more services and/or software applications, including identity management services 1704, location services 1706, ride services 1708, and/or other services. Although FIG. 17 shows a certain number of services provided by transportation management system 1702, more or fewer services may be provided in various implementations. In addition, although FIG. 17 shows these services as being provided by transportation management system 1702, all or a portion of any of the services may be processed in a distributed fashion. For example, computations associated with a service task may be performed by a combination of transportation management system 1702 (including any number of servers, databases, etc.), one or more devices associated with a provider (e.g., devices integrated with managed vehicles 1714(a), 1714(b), and/or 1714(c); provider computing devices 1716 and tablets 1720; and transportation management vehicle devices 1718), and/or more or more devices associated with a ride requestor (e.g., the requestor's computing devices 1724 and tablets 1722). In some embodiments, transportation management system 1702 may include one or more general purpose computers, server computers, clustered computing systems, cloud-based computing systems, and/or any other computing systems or arrangements of computing systems. Transportation management system 1702 may be configured to run any or all of the services and/or software components described herein. In some embodiments, the transportation management system 1702 may include an appropriate operating system and/or various server applications, such as web servers capable of handling hypertext transport protocol (HTTP) requests, file transfer protocol (FTP) servers, database servers, etc.

In some embodiments, identity management services 1704 may be configured to perform authorization services for requestors and providers and/or manage their interactions and/or data with transportation management system 1702. This may include, e.g., authenticating the identity of providers and determining that they are authorized to provide services through transportation management system 1702. Similarly, requestors' identities may be authenticated to determine whether they are authorized to receive the requested services through transportation management system 1702. Identity management services 1704 may also manage and/or control access to provider and/or requestor data maintained by transportation management system 1702, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 1702 may also manage and/or control access to provider and/or requestor data stored with and/or obtained from third-party systems. For example, a requester or provider may grant transportation management system 1702 access to a third-party email, calendar, or task management system (e.g., via the user's credentials). As another example, a requestor or provider may grant, through a mobile device (e.g., 1716, 1720, 1722, or 1724), a transportation application associated with transportation management system 1702 access to data provided by other applications installed on the mobile device. In some examples, such data may be processed on the client and/or uploaded to transportation management system 1702 for processing.

In some embodiments, transportation management system 1702 may provide ride services 1708, which may include ride matching and/or management services to connect a requestor to a provider. For example, after identity management services module 1704 has authenticated the identity a ride requestor, ride services module 1708 may attempt to match the requestor with one or more ride providers. In some embodiments, ride services module 1708 may identify an appropriate provider using location data obtained from location services module 1706. Ride services module 1708 may use the location data to identify providers who are geographically close to the requestor (e.g., within a certain threshold distance or travel time) and/or who are otherwise a good match with the requestor. Ride services module 1708 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 1708 may use rule-based algorithms and/or machine-learning models for matching requestors and providers.

Transportation management system 1702 may communicatively connect to various devices through networks 1710 and/or 1712. Networks 1710 and 1712 may include any combination of interconnected networks configured to send and/or receive data communications using various communication protocols and transmission technologies. In some embodiments, networks 1710 and/or 1712 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1710 and/or 1712 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 902.12 family of standards, Bluetooth, Bluetooth Low Energy, Near Field Communication (NFC), Z-Wave, and ZigBee). In various embodiments, networks 1710 and/or 1712 may include any combination of networks described herein or any other type of network capable of facilitating communication across networks 1710 and/or 1712.

In some embodiments, transportation management vehicle device 1718 may include a provider communication device configured to communicate with users, such as drivers, passengers, pedestrians, and/or other users. In some embodiments, transportation management vehicle device 1718 may communicate directly with transportation management system 1702 or through another provider computing device, such as provider computing device 1716. In some embodiments, a requestor computing device (e.g., device 1724) may communicate via a connection 1726 directly with transportation management vehicle device 1718 via a communication channel and/or connection, such as a peer-to-peer connection, Bluetooth connection, NFC connection, ad hoc wireless network, and/or any other communication channel or connection. Although FIG. 17 shows particular devices communicating with transportation management system 1702 over networks 1710 and 1712, in various embodiments, transportation management system 1702 may expose an interface, such as an application programming interface (API) or service provider interface (SPI) to enable various third parties which may serve as an intermediary between end users and transportation management system 1702.

In some embodiments, devices within a vehicle may be interconnected. For example, any combination of the following may be communicatively connected: vehicle 1714, provider computing device 1716, provider tablet 1720, transportation management vehicle device 1718, requestor computing device 1724, requestor tablet 1722, and any other device (e.g., smart watch, smart tags, etc.). For example, transportation management vehicle device 1718 may be communicatively connected to provider computing device 1716 and/or requestor computing device 1724. Transportation management vehicle device 1718 may establish communicative connections, such as connections 1726 and 1728, to those devices via any suitable communication technology, including, e.g., WLAN technologies implementing the IEEE 902.12 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1702 using applications executing on their respective computing devices (e.g., 1716, 1718, 1720, and/or a computing device integrated within vehicle 1714), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1714 may include a vehicle-integrated computing device, such as a vehicle navigation system, or other computing device integrated with the vehicle itself, such as the management system of an autonomous vehicle. The computing device may run on any suitable operating systems, such as Android®, iOSC, macOS®, Windows®, Linux®, UNIX®, or UNIX$^6$-based or Linux$^o$-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 1702. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 18:
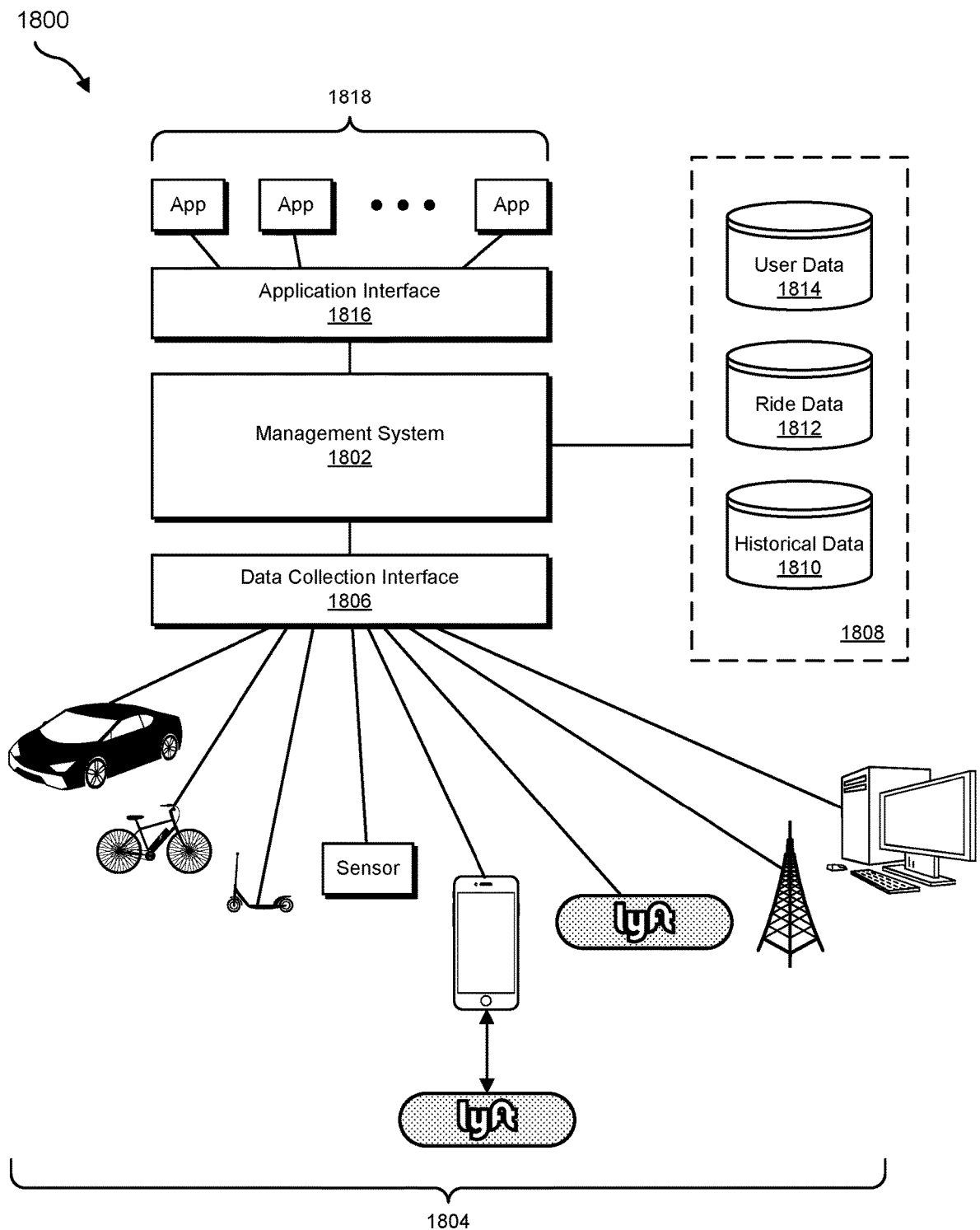
FIG. 18 is an illustration of an example data collection and application management system.

FIG. 18 shows a data collection and application management environment 1800, in accordance with various embodiments. As shown in FIG. 18, management system 1802 may be configured to collect data from various data collection devices 1804 through a data collection interface 1806. As discussed above, management system 1802 may include one or more computers and/or servers or any combination thereof. Data collection devices 1804 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1806 can include, e.g., an extensible device framework configured to support interfaces for each data collection device. In various embodiments, data collection interface 1806 may be extended to support new data collection devices as they are released and/or to update existing interfaces to support changes to existing data collection devices. In various embodiments, data collection devices may communicate with data collection interface 1806 over one or more networks. The networks may include any network or communication protocol as would be recognized by one of ordinary skill in the art, including those networks discussed above.

As shown in FIG. 18, data received from data collection devices 1804 can be stored in data store 1808. Data store 1808 may include one or more data stores, such as databases, object storage systems and services, cloud-based storage services, and other data stores. For example, various data stores may be implemented on a non-transitory storage medium accessible to management system 1802, such as historical data store 1810, ride data store 1812, and user data store 1814. Data stores 1808 can be local to management system 1802, or remote and accessible over a network, such as those networks discussed above or a storage-area network or other networked storage system. In various embodiments, historical data 1810 may include historical traffic data, weather data, request data, road condition data, or any other data for a given region or regions received from various data collection devices. Ride data 1812 may include route data, request data, timing data, and other ride related data, in aggregate and/or by requestor or provider. User data 1814 may include user account data, preferences, location history, and other user-specific data. Although certain data stores are shown by way of example, any data collected and/or stored according to the various embodiments described herein may be stored in data stores 1808.

As shown in FIG. 18, an application interface 1816 can be provided by management system 1802 to enable various apps 1818 to access data and/or services available through management system 1802. Apps 1818 may run on various user devices (including provider and requestor computing devices, such as those discussed above) and/or may include cloud-based or other distributed apps configured to run across various devices (e.g., computers, servers, or combinations thereof). Apps 1818 may include, e.g., aggregation and/or reporting apps which may utilize data 1808 to provide various services (e.g., third-party ride request and management apps). In various embodiments, application interface 1816 can include an API and/or SPI enabling third party development of apps 1818. In some embodiments, application interface 1816 may include a web interface, enabling web-based access to data 1808 and/or services provided by management system 1802. In various embodiments, apps 1818 may run on devices configured to communicate with application interface 1816 over one or more networks. The networks may include any network or communication protocol as would be recognized by one of ordinary skill in the art, including those networks discussed above, in accordance with an embodiment of the present disclosure.

While various embodiments of the present disclosure are described in terms of a ridesharing service in which the ride providers are human drivers operating their own vehicles, in other embodiments, the techniques described herein may also be used in environments in which ride requests are fulfilled using autonomous vehicles. For example, a transportation management system of a ridesharing service may facilitate the fulfillment of ride requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
    a lock component comprising a pin, wherein, in a locked state of the apparatus, a part of the lock component is secured in a lock housing such that a cantilevered portion of the pin, when in contact with a wheel of a wheeled vehicle, limits rotation of the wheel, and wherein, in the locked state of the apparatus, a proximal portion of the pin is supported by the lock housing and a distal portion of the pin comprises a free end that is externally unsupported; and
    a cable comprising a first end that attaches to the lock component and a second end that attaches to a mounting point on the wheeled vehicle, wherein the second end of the cable rotates relative to the mounting point about a longitudinal axis of the cable.

2. The apparatus of claim 1, wherein the second end of cable rotates relative to the mounting point about both the longitudinal axis of rotation and a second axis of rotation different from the longitudinal axis of rotation.

3. The apparatus of claim 2, wherein the longitudinal axis of rotation is substantially perpendicular to the second axis of rotation.

4. The apparatus of claim 2, wherein the second axis of rotation is afforded by the mounting point rotating relative to the wheeled vehicle.

5. The apparatus of claim 1, wherein the longitudinal axis of rotation is afforded by the cable rotating relative to the mounting point.

6. The apparatus of claim 1, wherein the cable rotates relative to the mounting point around an axis of rotation that is perpendicular to a surface of the wheeled vehicle to which the mounting point is coupled.

7. The apparatus of claim 1, wherein the cable rotating relative to the mounting point is enabled by a crimp fitting that couples the cable to a cable component that is coupled to the mounting point.

8. The apparatus of claim 1, further comprising a cable housing, a first part of which is coupled to the cable and a second part of which is coupled to the mounting point, wherein the first part is substantially perpendicular to the second part.

9. The apparatus of claim 1, wherein a combination of a length of the cable and a flexibility of the cable enable the cable to form a one-hundred-and-eighty-degree bend.

10. The apparatus of claim 1, wherein rotation of the cable relative to the mounting point facilitates locking the wheeled vehicle to a stationary object via the cable when the lock component is in contact with the wheel of the wheeled vehicle.

11. The apparatus of claim 1, wherein the rotation of the cable relative to the mounting point facilitates locking the wheeled vehicle to stationary objects comprising a variety of physical orientations that comprise horizontal orientations, vertical orientations, and diagonal orientations.

12. A system comprising:
    a lock component comprising a pin, wherein, in a locked state of the system, a part of the lock component is secured in a lock housing such that a cantilevered portion of the pin, when in contact with a wheel of a wheeled vehicle, limits rotation of the wheel, and wherein, in the locked state of the system, a proximal portion of the pin is supported by the lock housing and a distal portion of the pin comprises a free end that is externally unsupported; and
    a cable comprising a first end that attaches to the lock component and a second end that attaches to a mounting point on the wheeled vehicle, wherein the first end of the cable rotates relative to the lock component about a longitudinal axis of the cable.

13. The system of claim 12, wherein the first end of the cable rotating relative to the lock component is enabled by a crimped fitting that is coupled to the first end of the cable.

14. The system of claim 13, wherein the lock component further comprises a handle, wherein the crimped fitting is disposed within the handle, and wherein the handle is coupled to the lock component.

15. The system of claim 12, further comprising a holster for the lock component into which the lock component can be inserted while attached to the cable, wherein a length of the cable extending between the lock component and the mounting point forms an arc when the lock component is inserted into the holster.

16. A method of assembling an apparatus comprising:
    coupling one end of a cable to a mounting point provided on a surface of a wheeled vehicle such that the cable rotates relative to the mounting point about a longitudinal axis of the cable;
    coupling another end of the cable to a lock component comprising a pin; and
    securing, in a locked state of the apparatus, a part of the lock component in a lock housing such that a cantilevered portion of the pin, when in contact with a wheel of the wheeled vehicle, limits rotation of the wheel, wherein, in the locked state of the apparatus, a proximal portion of the pin is supported by the lock housing and a distal portion of the pin comprises a free end that is externally unsupported.

17. The apparatus of claim 1, wherein, in a locked state of the apparatus, the pin extends into a first side of the wheel, wherein the free end of the pin is contained within a width of the wheel.

18. The apparatus of claim 1, wherein the mounting point is disposed on a plane passing through a circumferential perimeter of the wheel.

19. The apparatus of claim 18, wherein, in an unlocked state of the apparatus, the lock component is secured in a holster, the holster disposed parallel to the plane passing through the circumferential perimeter of the wheel, wherein a length of the cable extending between the lock component and the mounting point forms an arc.

\* \* \* \* \*